(12) United States Patent
Sugimoto et al.

(10) Patent No.: US 9,584,801 B2
(45) Date of Patent: Feb. 28, 2017

(54) IMAGE PICKUP DEVICE, CALIBRATION SYSTEM, CALIBRATION METHOD, AND PROGRAM

(71) Applicant: FUJIFILM Corporation, Tokyo (JP)

(72) Inventors: Masahiko Sugimoto, Saitama (JP); Kenkichi Hayashi, Saitama (JP); Yousuke Naruse, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/884,246

(22) Filed: Oct. 15, 2015

(65) Prior Publication Data

US 2016/0037158 A1 Feb. 4, 2016

Related U.S. Application Data

(63) Continuation of application No. PCT/JP2014/060616, filed on Apr. 14, 2014.

(30) Foreign Application Priority Data

Apr. 16, 2013 (JP) .................................. 2013-085781

(51) Int. Cl.
*H04N 5/232* (2006.01)
*H04N 5/357* (2011.01)
(Continued)

(52) U.S. Cl.
CPC ........... *H04N 17/002* (2013.01); *G06T 5/003* (2013.01); *H04N 5/2254* (2013.01);
(Continued)

(58) Field of Classification Search
CPC .. H04N 1/603–1/6033; H04N 21/4223; H04N 5/2356; G06T 7/0018; G06T 7/0022
See application file for complete search history.

(56) References Cited

U.S. PATENT DOCUMENTS 6,285,799 B1 * 9/2001 Dance ..................... G06T 5/003
382/260
2003/0183771 A1 10/2003 Hirai
(Continued)

FOREIGN PATENT DOCUMENTS

JP 2003-284707 A 10/2003
JP 2006-30859 A 2/2006
(Continued)

OTHER PUBLICATIONS

International Search Report issued in PCT/JP2014/060616, dated May 13, 2014.
(Continued)

*Primary Examiner* — Michael Teitelbaum
(74) *Attorney, Agent, or Firm* — Birch, Stewart, Kolasch & Birch, LLP

(57) ABSTRACT

An image capturing device 100 includes: an image pickup unit 248; a chart storage unit 240; a chart transmission control unit 242; a calibration necessity determination unit 244 that determines whether or not calibration of the parameters of the point image restoration processing is required based on a calibration image that is obtained by imaging a calibration chart displayed on an external display device using the image pickup unit 248; a calibration control unit 246 that controls the execution of the calibration according to the determination regarding whether or not the calibration is required that has been performed by the calibration necessity determination unit 244; and a calibration execution unit 247.

21 Claims, 24 Drawing Sheets

(51) Int. Cl.
*G06T 5/00* (2006.01)
*H04N 17/00* (2006.01)
*H04N 5/225* (2006.01)
*H04N 5/235* (2006.01)

(52) U.S. Cl.
CPC ....... *H04N 5/2356* (2013.01); *H04N 5/23229* (2013.01); *H04N 5/3572* (2013.01)

(56) References Cited

U.S. PATENT DOCUMENTS

| | | |
|---|---|---|
| 2007/0025716 A1 | 2/2007 | Ichimiya |
| 2007/0140579 A1 | 6/2007 | Miyashita |
| 2009/0245688 A1* | 10/2009 | Robinson .................. G06T 5/50 382/284 |
| 2012/0281132 A1 | 11/2012 | Ogura et al. |
| 2013/0147948 A1 | 6/2013 | Higuchi et al. |

FOREIGN PATENT DOCUMENTS

| | | |
|---|---|---|
| JP | 2007-33997 A | 2/2007 |
| JP | 2007-41095 A | 2/2007 |
| JP | 2007-81685 A | 3/2007 |
| JP | 2009-200782 A | 9/2009 |
| JP | 2010-183488 A | 8/2010 |
| JP | 2011-150635 A | 8/2011 |
| JP | 2011-193277 A | 9/2011 |
| JP | 2012-75060 A | 4/2012 |
| WO | WO 2012/063449 A1 | 5/2012 |

OTHER PUBLICATIONS

Written Opinion of the International Searching Authority issued in PCT/JP2014/060616, dated May 13, 2014.

\* cited by examiner

FIG. 11
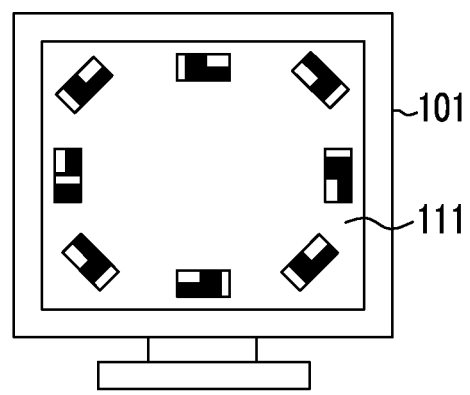
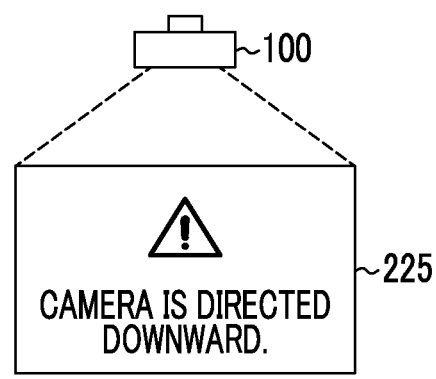

IMAGE PICKUP DEVICE, CALIBRATION SYSTEM, CALIBRATION METHOD, AND PROGRAM

CROSS-REFERENCE TO RELATED APPLICATIONS

This application is a Continuation of PCT International Application No. PCT/JP2014/060616 filed on Apr. 14, 2014, which claims priority under 35 U.S.C §119(a) to Patent Application No. 2013-085781 filed in Japan on Apr. 16, 2013, all of which are hereby expressly incorporated by reference into the present application.

BACKGROUND OF THE INVENTION

1. Field of the Invention

The present invention is a technique related to an image pickup device, a calibration system, a calibration method, and a program, and in particular, relates to a calibration in processing for the restoration of a point image to a captured image that is performed based on a point spread function (PSF).

2. Description of the Related Art

In a captured image obtained by imaging a subject with an image pickup device, such as a digital camera, there is a case in which image degradation due to various aberrations relevant to an optical system (imaging lens and the like) occurs.

In order to reduce the image degradation (diffraction blur, peripheral blur, lateral chromatic aberration, and the like) due to the aberrations, techniques for removing (modifying) the image degradation due to the aberrations by performing image processing on the image data of a subject image has been considered.

Since the image degradation due to aberrations can be expressed by the point spread function, it is possible to restore the image quality by performing point image restoration processing based on the point spread function on the captured image with degraded image quality. That is, the point image restoration processing is processing for eliminating the image degradation by executing a restoration filter (inverse filter) of the point spread function on the captured image data.

Since the image degradation is influenced by individual variations in an optical system (lens) or by individual variations when manufacturing the image pickup device body, it can be expected that the quality of a captured image will be improved by performing imaging after calibrating the optical system and the image pickup device body that are used by the user.

In order for the user to adjust the parameters of restoration processing (considered to correspond to the point image restoration processing of the present application) while checking the image data that has been subjected to the restoration processing even when there are characteristics of the lens due to manufacturing variations, JP-2011-193277A discloses a technique of reducing the burden on the user at the time of parameter adjustment by automatically presenting an adjustment image region where restoration processing is effective.

JP-2007-81685A discloses a technique capable of performing display adjustment suitable for the environment around a user or the display characteristics of an external display device by capturing an adjustment image pattern of an external image display device using image pickup means and calculating the correction values of parameters of image processing, such as white balance.

JP-2009-200782A discloses a technique of easily performing image output characteristic adjustment based on an image obtained by capturing an image displayed on an image output device.

SUMMARY OF THE INVENTION

In the techniques disclosed in JP-2011-193277A, JP-2007-81685A, and JP-2009-200782A, effective techniques when calibrating the parameters of the point image restoration processing in the image pickup device having a point image restoration processing function is not disclosed. Accordingly, since the burden on the user at the time of calibration is large, it may not be possible to perform accurate calibration. That is, in the image pickup device that performs point image restoration processing on a captured image, a technique of performing calibration (parameter adjustment) before capturing an image to be subjected to the point image restoration processing is not disclosed.

The present invention has been made in view of such a situation. According to the present invention, when performing calibration of the parameters of point image restoration processing according to the individual variations in an image pickup device or the like, it is possible to perform calibration accurately while reducing the burden on the user. As a result, it is possible to reduce the degradation of a captured image caused by the individual variations in the image pickup device.

In order to achieve the above-described object, an image pickup device according to an aspect of the present invention includes: an image pickup unit; a chart storage unit that stores a calibration chart relating to parameters of point image restoration processing; a chart transmission control unit that transmits the calibration chart stored in the chart storage unit to an external display device; a calibration necessity determination unit that determines whether or not calibration of the parameters of the point image restoration processing is required based on a calibration image, which is obtained by imaging the calibration chart displayed on the external display device using the image pickup unit, and outputs the determination result; a calibration control unit that controls execution of the calibration by outputting a calibration execution command according to the determination regarding whether or not the calibration is required that is output from the calibration necessity determination unit; and a calibration execution unit that performs the calibration of the parameters of the point image restoration processing based on the calibration image in response to the calibration execution command output from the calibration control unit.

Therefore, when performing the calibration of the parameters of the point image restoration processing according to the individual variations in the image capturing device or the like, it is possible to perform the calibration accurately while reducing the burden on the user. As a result, it is possible to reduce the degradation of the captured image caused by the individual variations in the image pickup device or the like.

In addition, since the calibration is performed by determining whether or not the calibration is required, it is possible to perform the calibration accurately when the calibration is required. Therefore, it is possible to suppress individual variations in the obtained captured image.

In the image pickup device, preferably, the image pickup unit has a bracketing imaging mode, and the calibration execution unit performs the calibration of the parameters of the point image restoration processing based on a plurality of calibration images captured by the image pickup unit in the bracketing imaging mode.

Therefore, since it is possible to automatically acquire a plurality of calibration images, it is possible to reduce the burden on the user. In addition, since the calibration of the parameters of point image restoration processing is performed based on a plurality of calibration images, it is possible to perform more accurate calibration.

In the image pickup device, preferably, the image pickup unit acquires the calibration image under some of a plurality of imaging conditions in the bracketing imaging mode, and the calibration execution unit performs the calibration of the parameters of the point image restoration processing based on the calibration image captured under some of the plurality of imaging conditions.

Therefore, it is possible to reduce the load when acquiring a calibration image and the burden on the user.

In the image pickup device, preferably, the image pickup unit is synchronized with the external display device, and the image pickup unit images the calibration chart that is displayed in synchronization with the external display device according to imaging of the image pickup unit in the bracketing imaging mode.

Therefore, since the user does not need to set an external display device and the imaging timing, it is possible to reduce the burden on the user when acquiring a calibration image.

In the image pickup device, preferably, the image pickup unit is synchronized with the external display device, and the image pickup unit images the calibration chart that is displayed in synchronization with the external display device according to imaging of the image pickup unit.

Therefore, since the user does not need to set an external display device and the imaging timing, it is possible to reduce the burden on the user when acquiring a calibration image.

In the image pickup device, preferably, the image pickup device further includes an imaging environment determination unit that determines whether or not an imaging environment is suitable for acquisition of the calibration image based on the calibration image, and the calibration control unit further controls execution of the calibration according to the determination of the imaging environment determination unit regarding whether or not the imaging environment is suitable for acquisition of the calibration image.

Therefore, since it is possible to acquire the calibration image in the imaging environment suitable for the acquisition of the calibration image, it is possible to perform more accurate calibration.

In the image pickup device, preferably, the chart storage unit further has an environment determination chart, the chart transmission control unit further transmits an environment determination chart to the external display device, and the imaging environment determination unit determines whether or not the imaging environment is suitable for acquisition of the calibration image based on an environment determination image obtained by imaging the environment determination chart displayed on the external display device using the image pickup unit or based on the environment determination image and the calibration image.

Therefore, it is possible to determine whether or not the imaging environment is suitable for the acquisition of a calibration image for more various conditions.

In the image pickup device, preferably, the imaging environment determination unit determines whether or not the imaging environment is suitable for acquisition of the calibration image based on a plurality of calibration images.

Therefore, since it is possible to acquire the calibration image in the imaging environment suitable for the acquisition of a more accurate calibration image, it is possible to perform more accurate calibration.

In the image pickup device, preferably, the imaging environment determination unit determines whether or not the imaging environment is suitable for acquisition of the calibration image based on a plurality of environment determination images or based on one or a plurality of environment determination images and one or a plurality of calibration images.

Therefore, since it is possible to acquire the calibration image in the imaging environment suitable for the acquisition of a more accurate calibration image, it is possible to perform more accurate calibration.

In the image pickup device, preferably, the chart transmission control unit acquires information regarding display performance of the external display device, and transmits the calibration chart corresponding to the display performance to the external display device.

Therefore, since the calibration chart is displayed more accurately on the external display device, it is possible to acquire a more appropriate calibration image.

In the image pickup device, preferably, the chart transmission control unit acquires information regarding display performance of the external display device, and transmits the calibration chart and the environment determination chart corresponding to the display performance to the external display device.

Therefore, since the calibration chart is displayed more accurately on the external display device, it is possible to acquire a more appropriate calibration image.

In the image pickup device, preferably, the image pickup device further includes a point image restoration processing unit that performs point image restoration processing on an image captured by the image pickup unit, and the point image restoration processing unit performs the point image restoration processing using parameters of the point image restoration processing after the calibration.

Therefore, since it is possible to perform point image restoration processing using the parameters of point image restoration processing according to the individual variations in the image pickup device, it is possible to obtain a captured image in which the individual variations in the image pickup device are reduced further.

In the image pickup device, preferably, the image pickup device performs imaging under imaging conditions corresponding to parameters of the point image restoration processing after the calibration, and has a preferential imaging mode in which the point image restoration processing is preferentially performed using parameters of the point image restoration processing after the calibration.

Therefore, when performing point image restoration processing on the obtained captured image, it is possible to obtain a captured image in which the individual variations in the image pickup device are reduced further.

In the image pickup device, preferably, the image pickup device further includes a check image display control unit and a check image display unit, and the check image display control unit displays information indicating that the calibration has been completed on the check image display unit when imaging is performed using imaging conditions corresponding to parameters of the point image restoration processing after the calibration.

Therefore, since it is possible to present the calibrated imaging conditions to the user, it is possible to prevent the execution of unnecessary calibration. As a result, it is possible to reduce the burden on the user.

In the image pickup device, preferably, the image pickup device further includes a check image display control unit and a check image display unit, and the check image display control unit displays a warning sign on the check image display unit when the imaging environment determination unit determines that the imaging environment is not suitable.

Therefore, it is possible to increase a possibility that the calibration image will be acquired in the imaging environment suitable for the acquisition of the calibration image.

In the image pickup device, preferably, the check image display control unit displays a check image before main imaging and information indicating that the calibration has been completed on the check image display unit, according to a preliminary imaging instruction signal.

In the image pickup device, preferably, when displaying a captured image that has been captured by the image pickup unit under imaging conditions corresponding to the parameters of point image restoration processing after the calibration, the check image display control unit displays information indicating that the calibration has been completed on the check image display unit.

In the image pickup device, preferably, the image pickup unit includes a replaceable lens. In the image pickup device, preferably, the image pickup unit includes a lens that extends a depth of field by modulating a phase.

In order to achieve the above-described object, a calibration system according to another aspect of the present invention is a calibration system that includes an image pickup device and a display device and that performs calibration of parameters of point image restoration processing. The image pickup device includes: an image pickup unit; a chart storage unit that stores a calibration chart relating to parameters of the point image restoration processing; a chart transmission control unit that transmits the calibration chart stored in the chart storage unit to the display device; a calibration necessity determination unit that determines whether or not calibration of the parameters of the point image restoration processing is required based on a calibration image that is obtained by imaging the calibration chart displayed on a display unit of the display device using the image pickup unit; a calibration control unit that controls execution of the calibration according to the determination regarding whether or not the calibration is required that has been performed by the calibration necessity determination unit; and a calibration execution unit that performs the calibration of the parameters of the point image restoration processing based on the calibration image under the control of the calibration control unit. The display device includes: a chart receiving unit that receives the calibration chart transmitted from the chart storage unit; a chart display control unit that controls display of the calibration chart on a display screen; and a display unit that displays the calibration chart.

In order to achieve the above-described object, a calibration method according to still another aspect of the present invention includes: a chart transmission control step of transmitting a calibration chart relating to parameters of point image restoration processing to an external display device; a calibration necessity determination step of determining whether or not calibration of the parameters of the point image restoration processing is required based on a calibration image that is obtained by imaging the calibration chart displayed on the external display device using the image pickup unit; and a calibration execution step of performing the calibration of the parameters of the point image restoration processing based on the calibration image according to the determination regarding whether or not the calibration is required that has been performed in the calibration necessity determination step.

In order to achieve the above-described object, a program according to still another aspect of the present invention causes a computer to execute: a chart transmission control step of transmitting a calibration chart relating to parameters of point image restoration processing to an external display device; a calibration necessity determination step of determining whether or not calibration of the parameters of the point image restoration processing is required based on a calibration image that is obtained by imaging the calibration chart displayed on the external display device using the image pickup unit; and a calibration execution step of performing the calibration of the parameters of the point image restoration processing based on the calibration image according to the determination regarding whether or not the calibration is required that has been performed in the calibration necessity determination step.

According to the present invention, when performing calibration of the parameters of point image restoration processing according to the individual variations in the image pickup device or the like, it is possible to perform calibration accurately while reducing the burden on the user. Therefore, it is possible to reduce the degradation of the captured image caused by the individual variations in the image pickup device or the like.

BRIEF DESCRIPTION OF THE DRAWINGS

FIG. 11 is a diagram for explaining the modification example of the image pickup device.

DESCRIPTION OF THE PREFERRED EMBODIMENTS

Embodiments of the present invention will be described with reference to the accompanying diagrams. In addition, the following description is an example of the present invention, and is not intended to limit the present invention.

FIGS. 1(A) and 1(B) schematically show that an image pickup device 100, which is an example of the present invention, images a calibration chart displayed on an external display device 101. FIG. 1(A) shows that the image pickup device 100 images a calibration chart displayed on the external display device 101 and performs calibration of the parameters of point image restoration processing. In FIG. 1(A), the image pickup device 100 is a digital camera, the external display device 101 is a monitor, and a display unit 111 of the external display device 101 is a calibration chart. The calibration is performed in such a manner that the image pickup device 100 images a calibration chart displayed on the display unit 111 of the external display device 101 to acquire a calibration image.

FIG. 1(B) also schematically shows that the image pickup device 100 images a calibration chart displayed on the external display device 101. In FIG. 1(B), the external display device 101 is formed by a smartphone (multifunctional mobile phone). Thus, as long as the display unit 111 that can display an image is included, there is no particular limitation on the specific device of the external display device 101. For example, in addition to the examples shown in FIGS. 1(A) and 1(B), using a tablet terminal or the like as the external display device 101 may also be considered.

An image pickup unit 248 (refer to FIG. 4) of the image pickup device 100 and the external display device 101 may be synchronized with each other, so that the image pickup unit 248 may image a calibration chart that is displayed in synchronization with the external display device 101 according to the imaging of the image pickup unit 248. In addition, the image pickup unit 248 may be synchronized with the external display device 101, so that the image pickup unit 248 may image a calibration chart that is displayed in synchronization with the external display device 101 according to the imaging of the image pickup unit 248 in a bracketing imaging mode, which will be described later.

Figure 2:
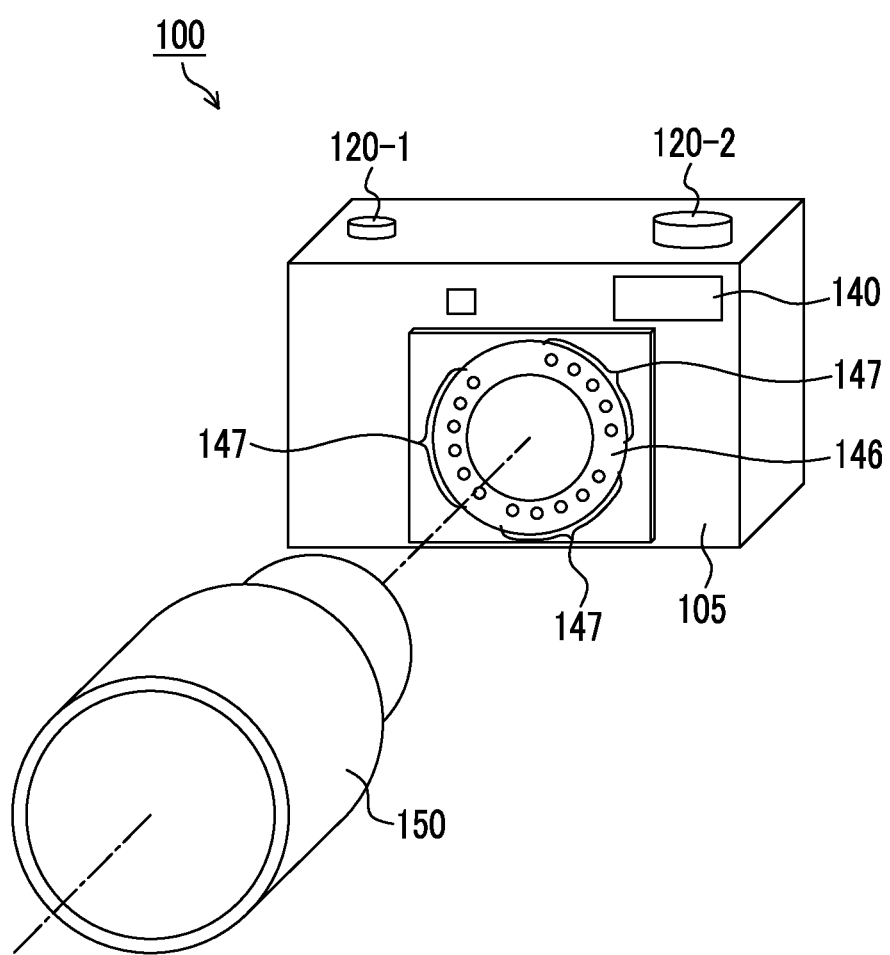
FIG. 2 is a perspective view showing the appearance of the front of the image pickup device.

FIG. 2 is a perspective view showing the appearance of the image pickup device 100. The image pickup device 100 includes an image pickup device body 105 and a lens device 150 that is replaceably mounted in the image pickup device body 105. A mount 146 (transmission means, receiving means) provided in the image pickup device body 105 and a mount (receiving means, transmission means) (not shown) on the lens device 150 side corresponding to the mount 146 are connected to each other, so that the image pickup device body 105 and the lens device 150 are replaceably mounted. Not only the mount 146 but also a flash 140 is provided on the front surface of the image pickup device body 105, and a release button 120-1 and a dial 120-2 for imaging mode setting are provided on the top surface. As an imaging mode that can be set by the dial for imaging mode setting, a calibration mode or a preferential imaging mode, in which imaging based on the imaging conditions corresponding to the parameters of point image restoration processing after calibration is preferentially performed, can be considered. Although the image pickup device 100 including a replaceable lens has been described in FIG. 2, the present invention is not particularly limited thereto.

A terminal 147 (transmission means, receiving means) is provided in the mount 146, and a terminal (transmission means, receiving means) (not shown) is provided in the mount on the lens device 150 side. Accordingly, if the lens device 150 is mounted in the image pickup device body 105, the terminal 147 is brought into contact with the terminal in the mount on the lens device 150 side to allow communication therebetween. The terminal 147 in FIG. 2 is shown conceptually, and the position and number of terminals in the present invention are not limited to those in this diagram.

Figure 3:
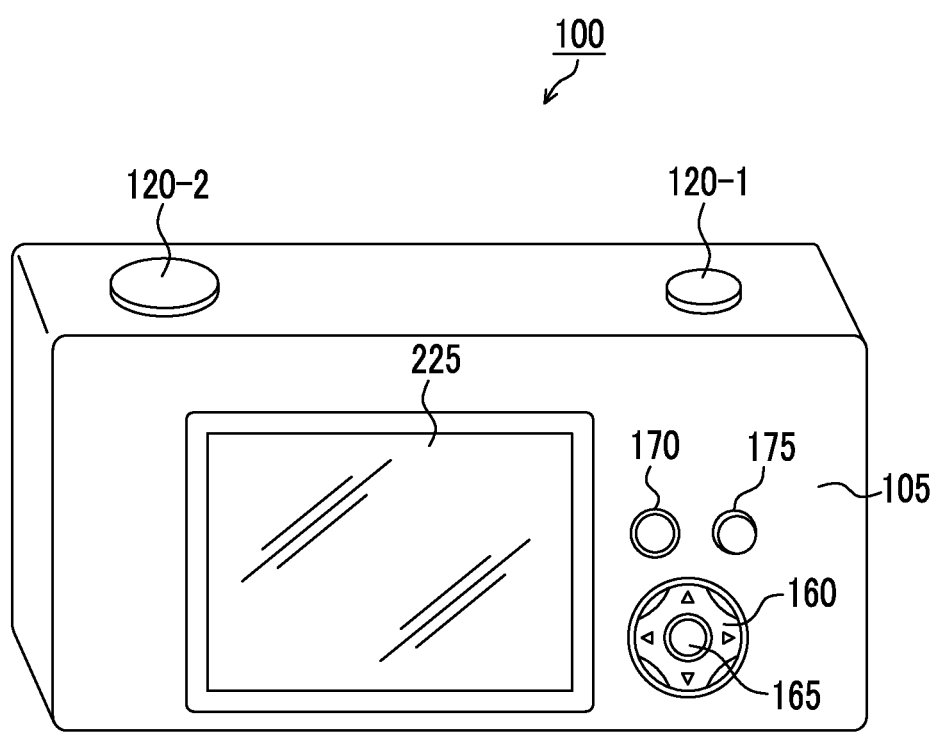
FIG. 3 is a perspective view showing the appearance of the back of the image pickup device.

On the other hand, as shown in FIG. 3, a monitor (check image display unit 225), a cross button 160, a MENU/OK button 165, a play button 170, a BACK button 175, and the like are disposed on the back of the image pickup device body 105.

Figure 4:
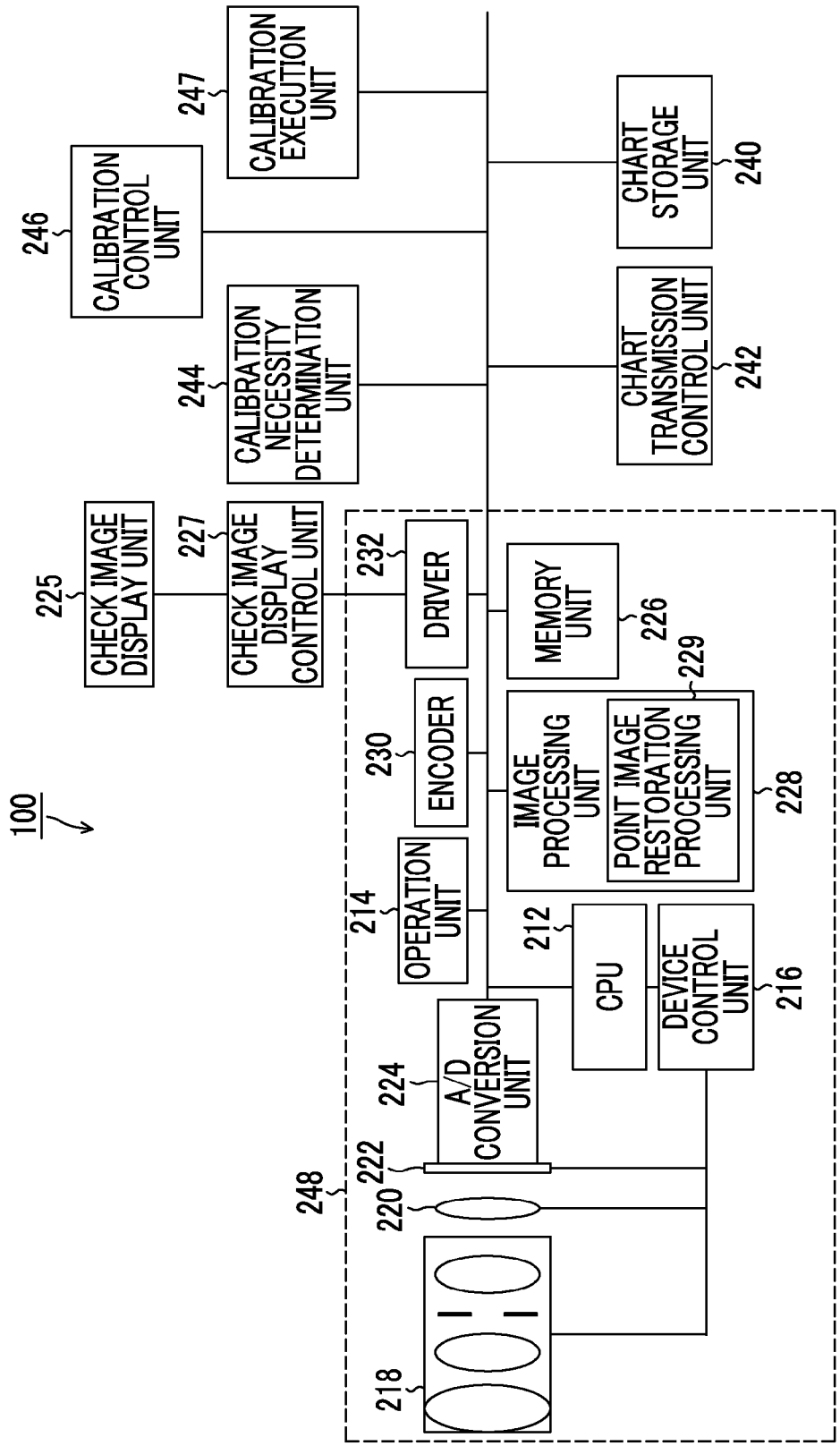
FIG. 4 is a block diagram of a main part of the image pickup device.

FIG. 4 is a main part block diagram illustrating a main part of the image pickup device 100 according to the present invention. The image pickup device 100 includes the image pickup unit 248, the check image display unit 225, a check image display control unit 227, a chart transmission control unit 242, a chart storage unit 240, a calibration necessity determination unit 244, a calibration control unit 246, and a calibration execution unit 247. In addition, the image pickup unit 248 includes a lens unit 218, a shutter 220, an image pickup element 222, an A/D conversion unit 224, a CPU 212, an operation unit 214, a device control unit 216, a memory unit 226, an image processing unit 228, a point image restoration processing unit 229, an encoder 230, and a driver 232.

The image pickup device 100 can record a captured image in an internal memory (memory unit 226) or an external recording medium (not shown), and the overall operation of the device is controlled by the central processing unit (CPU) 212.

The operation unit 214 including a shutter button or a shutter switch, a mode dial, a play button, a MENU/OK key, a cross key, a zoom button, and a BACK key is provided in the image pickup device 100. A signal from the operation unit 214 is input to the CPU 212, and the CPU 212 controls each circuit of the image pickup device 100 based on the input signal. For example, the lens unit 218, the shutter 220, and the image pickup element 222 are controlled through the device control unit 216, and imaging operation control, image processing control, image data recording/reproduction control, display control of the check image display unit 225, and the like are performed.

The lens unit 218 includes a focus lens, a zoom lens, a diaphragm, and the like, and light beams having passed through the lens unit 218 and the shutter 220 are formed on the light receiving surface of the image pickup element 222. The lens unit 218 of the image pickup unit 248 may be a replaceable type, or may be a non-replaceable type. In addition, the lens unit 218 of the image pickup unit 248 may extend the depth of field by modulating the phase.

In the image pickup element 222, a number of light-receiving elements (photodiodes) are arranged in a two-dimensional manner, and a subject image formed on the light receiving surface of each photodiode is converted into a signal voltage (or a charge) of an amount corresponding to the amount of incident light.

For color filters used in the image pickup element 222, various arrangements (color filter arrangements) can be used, and there is no particular limitation. For example, it is possible to use the Bayer arrangement in the image pickup element 222.

Signal charges accumulated in the image pickup element 222 are read as a voltage signal corresponding to signal charges based on a read signal applied from the device control unit 216. The voltage signal read from the image pickup element 222 is applied to the A/D conversion unit 224. Here, the voltage signal is sequentially converted into digital red (R), green (G), and blue (B) signals corresponding to the color filter arrangement, and is stored in the memory unit 226.

The memory unit 226 includes an SDRAM that is a volatile memory, an EEPROM that is a rewritable nonvolatile memory, and the like. The SDRAM is used as a work area at the time of execution of a program by the CPU 212 and as a storage area where a digital image signal acquired by imaging is temporarily stored. On the other hand, a camera control program including an image processing program, defect information of pixels of the image pickup element 222, various parameters or tables used in image processing, and the like are stored in the EEPROM.

The image processing unit 228 performs signal processing, such as white balance correction, gamma correction processing, demosaic processing (also referred to as synchronization processing), RGB/YC conversion, contour correction, chromatic aberration correction, and point image restoration processing, on the digital image signal that is stored in the memory unit 226. In the present invention, there is no particular limitation on the order of the signal processing. The point image restoration processing unit 229 is provided in the image processing unit 228. Detailed explanation of the point image restoration processing unit 229 will be given later. In FIG. 4, the point image restoration processing unit 229 is provided in the image processing unit 228 in the image pickup unit 248. However, the point image restoration processing unit 229 is not limited to being provided in the image processing unit 228 in the image pickup unit 248. For example, the point image restoration processing unit 229 may be provided separately from the image processing unit 228, or may be provided separately from the image pickup unit 248.

Image data processed using the image processing unit 228 is encoded into data for image display by the encoder 230, and is output to the check image display unit 225 provided on the back of the camera through the driver 232. Therefore, a subject image is continuously displayed on the display screen of the check image display unit 225.

The shutter button (release switch) of the operation unit 214 is operation means for inputting an instruction to start imaging, and is a so-called two-step stroke type switch having "half press" and "full press" states. In the image pickup device 100 (digital camera), an S1-ON signal (preliminary imaging instruction signal) is output when the shutter button is half-pressed, and an S2-ON signal (main imaging instruction signal) is output when the shutter button is fully-pressed by further pressing the shutter button in the half-pressed state. Imaging preparation processing, such as automatic focusing (AF processing) or automatic exposure control (AE processing), is performed when the S1-ON signal is output, and imaging processing is performed when the S2-ON signal is output.

The shutter button is not limited to the form of the two-step stroke type switch having "half press" and "full press" states, and the S1-ON signal and the S2-ON signal may be output by one operation, or individual switches may be provided to output the S1-ON signal and the S2-ON signal. In the form of making an operation instruction using a touch panel or the like, as the operation means, an operation instruction may be output by touching a region corresponding to the operation instruction displayed on the screen of the touch panel. In the present invention, the form of the operation means is not limited to these as long as the imaging preparation processing or the imaging processing is instructed. In addition, the imaging preparation processing and the imaging processing may be consecutively performed by the operation instruction given to one operation means.

When the first-step pressing (half pressing) is performed on the shutter button of the operation unit 214, the CPU 212 receives a preliminary imaging instruction signal that is output according to the first-step pressing (half pressing), and starts the AF operation and the AE operation. Then, control to match the focus lens on the focal position is performed by moving the focus lens of the lens unit 218 in the optical axis direction through the device control unit 216.

The CPU 212 receives the preliminary imaging instruction signal that is output by half-pressing the shutter button, calculates the brightness of the subject based on the image data output from the A/D conversion unit 224, and determines exposure conditions. The determination of exposure conditions is not limited to the time of half-pressing of the shutter button.

When the AE operation and the AF operation end and there is second-stage pressing (full pressing) on the shutter button, the main imaging is performed by controlling the charge accumulation time in the shutter 220, and the image pickup element 222 according to the exposure conditions determined as described above. The image data of the mosaic image (image corresponding to the color filter arrangement) of R, and B, which has been A/D converted by the A/D conversion unit 224 after being read from the image pickup element 222 at the time of main imaging, is temporarily stored in the memory unit 226.

The image data temporarily stored in the memory unit 226 is appropriately read by the image processing unit 228, and predetermined signal processing including white balance correction, gamma correction, demosaic processing (synchronization processing), RGB/YC conversion, contour correction, color correction, and point image restoration processing, is performed by the image processing unit 228. Image data (YC data) that has been RGB/YC converted is compressed according to a predetermined compression format (for example, a JPEG method), and the compressed image data is recorded in the internal memory or an external memory in a predetermined image file (for example, an Exif file) format.

The check image display control unit 227 displays the captured image, which is transmitted from the driver 232 after being captured by the image pickup unit 248, on the check image display unit 225. In the case of performing imaging using the imaging conditions corresponding to the parameters of point image restoration processing after calibration, information indicating that the calibration has been completed may be displayed on the check image display unit 225. As will be described later, when an imaging environment determination unit 245 determines that the imaging environment is not suitable, the check image display control unit 227 displays a warning sign on the check image display unit 225.

The check image display control unit 227 may display a check image before the main imaging and information indicating that the calibration has been completed on the check image display unit 225 according to the preliminary imaging instruction signal that is output by the half-pressing of the shutter button provided in the operation unit 214 of the image pickup unit 248. In addition, when displaying the captured image that has been captured by the image pickup unit 248 under the imaging conditions corresponding to the parameters of point image restoration processing after calibration, the check image display control unit 227 displays information indicating that the calibration has been completed on the check image display unit 225.

The image pickup device 100 includes the chart transmission control unit 242, the chart storage unit 240, the calibration necessity determination unit 244, the calibration control unit 246, and the calibration execution unit 247. These will be described in detail with reference to FIG. 5.

Figure 5:
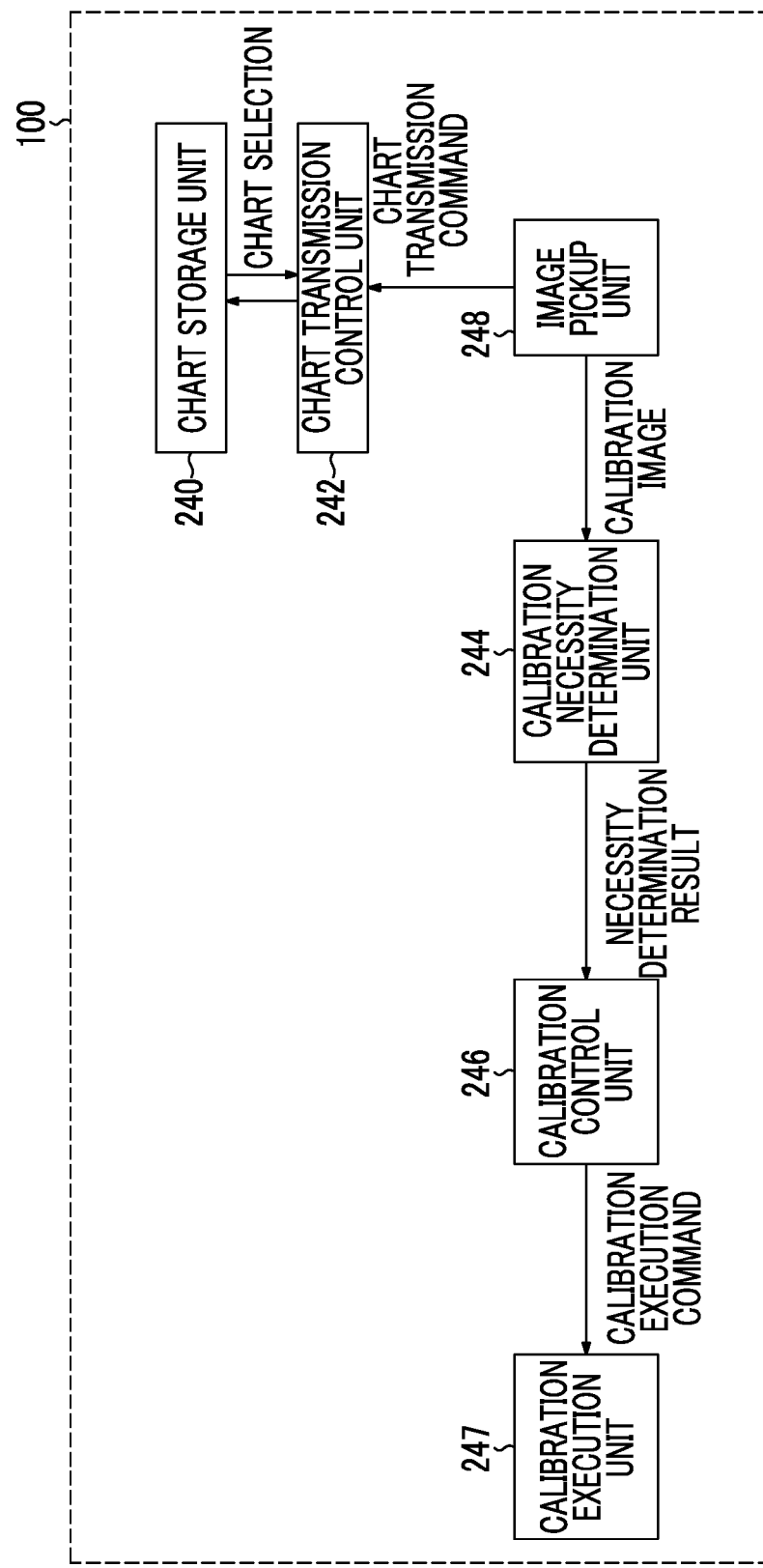
FIG. 5 is a block diagram of a main part of the image pickup device.

FIG. 5 is a diagram illustrating the chart transmission control unit 242, the chart storage unit 240, the calibration necessity determination unit 244, the calibration control unit 246, and the calibration execution unit 247 of the image pickup device 100.

The chart storage unit 240 stores a calibration chart relating to the parameters of point image restoration processing. Here, the calibration chart relating to the parameters of point image restoration processing is not particularly limited as long as it is suitable for the calibration of the parameters of point image restoration processing. That is, it is possible to use various images including a normal image, which can be used for calibration, without being limited to the chart (for image evaluation) in a general sense.

For example, as shown in FIGS. 1(A) and 1(B), it is possible to mention a calibration chart having a pattern in which high-contrast portions are arranged in the tangential direction of the calibration chart. In addition, a calibration chart having a pattern in which high-contrast portions are arranged at the four corners of the calibration chart can also be appropriately adopted. It is also possible to use a calibration chart in which high-contrast portions are arranged in the sagittal direction perpendicular to the tangential direction.

As a more specific example, an image can be mentioned in which there is a straight image along the sagittal or tangential direction. Since there is a straight image in the sagittal or tangential direction, it is possible to further increase the data acquisition area when performing calibration. That is, when imaging a subject from which a straight image arranged in the sagittal direction or the tangential direction can be obtained in a captured image, it is possible to obtain useful data in terms of adjusting the parameters of point image restoration processing.

Here, "along the sagittal direction or the tangential direction" allows deviation from the sagittal direction or the tangential direction within a range not inhibiting the effect of the present invention.

In addition, the reference to the sagittal direction and the tangential direction herein is assumed to be with respect to a captured image (image obtained by the imaging of the image pickup unit). Originally, it is desirable to define the sagittal direction or the tangential direction of an optical image projected on the image pickup element surface shape. However, it is possible to obtain a calibration image only based on the image data received and acquired by the image pickup element. Therefore, there is no problem in considering the sagittal direction or the tangential direction with the captured image as a reference. Here, the tangential direction refers to a tangential direction with respect to the circumference relative to the center of the captured image, and the sagittal direction refers to a direction perpendicular to the tangential direction.

In addition, the parameters of point image restoration processing herein refer to parameters contributing to the content of the point image restoration processing, such as a restoration filter coefficient, a coring coefficient, a gain coefficient, and a point spread function (PSF). The chart storage unit 240 can store one or a plurality of calibration charts.

The chart transmission control unit 242 selects a calibration chart stored in the chart storage unit 240, and transmits the selected calibration chart to the external display device 101. When the execution of calibration is instructed through the operation unit 214 (refer to FIG. 4) in the image pickup unit 248, an instruction to select and transmit a calibration chart is output from the CPU 212 in the image pickup unit 248 to the chart transmission control unit 242. The calibration chart selection and transmission instruction given to the chart transmission control unit 242 is not limited to being output from the CPU 212 in the image pickup unit 248.

The chart transmission control unit 242 transmits the calibration chart to the external display device 101. When the external display device 101 includes a chart receiving unit or the like, the chart transmission control unit 242 transmits the calibration chart to the chart receiving unit or the like. Here, the chart transmission means of the chart transmission control unit 242 is not particularly limited. For example, a calibration chart may be transmitted from the chart transmission control unit 242 to the external display device 101 through radio communication. In addition, a calibration chart may be transmitted from the chart transmission control unit 242 to a chart receiving unit 270 of the external display device 101 by using an external memory, such as an SD card. In addition, the image pickup device 100 and the external display device 101 may be connected to each other, for example, through a communication cable such as a high-definition multimedia interface (HDMI®) cable, a calibration chart may be transmitted from the image pickup device 100 to the external display device 101, and the external display device 101 may display the received calibration chart.

The image pickup unit 248 of the image pickup device 100 images the calibration chart displayed on the external display device 101.

The calibration chart is imaged by the image pickup unit 248, and a calibration image is acquired by the image pickup unit 248. Then, the acquired calibration image is transmitted to the calibration necessity determination unit 244. The calibration necessity determination unit 244 determines whether or not calibration of the parameters of point image restoration processing is required based on the calibration image.

The calibration necessity determination unit 244 can determine whether or not calibration is required in various methods. For example, as shown in FIG. 6, it is possible to determine whether or not calibration is required based on the frequency response in the acquired calibration image.

Figure 6:
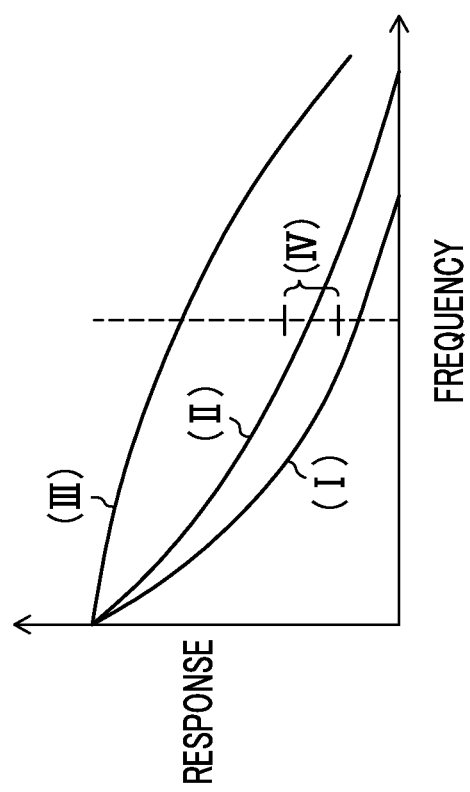
FIG. 6 is a diagram for explaining an example of determination performed by a necessity determination unit.

FIG. 6 shows a graph (I) of the frequency response of a calibration image when the calibration necessity determination unit 244 determines that calibration is required, a graph (II) of the frequency response of a calibration image when the calibration necessity determination unit 244 determines that calibration is not required, and a graph (III) of the frequency response that can be expected to be obtained when performing point image restoration processing on the calibration image.

The calibration necessity determination unit 244 analyzes the acquired calibration image, and determines that calibration is required when the graph indicated by (I) in FIG. 6 is obtained. In the example shown in FIG. 6, the criterion for determining whether or not to perform calibration is whether or not the response at a certain frequency is within a certain range. That is, (IV) in FIG. 6 shows a certain range of the response at a certain frequency. Since the curve (I) is not within the range indicated by (IV), the calibration necessity determination unit 244 determines that calibration is to be performed.

On the other hand, the calibration necessity determination unit 244 analyzes the acquired calibration image, and determines that calibration is not required when the graph indicated by (II) in FIG. 6 is obtained. That is, since the curve (II) is within the range indicated by (IV), the calibration necessity determination unit 244 determines that calibration is not to be performed. The determination regarding whether or not calibration is required that has been performed by the calibration necessity determination unit 244 is transmitted to the calibration control unit 246. In addition, a certain frequency referred to herein is not particularly limited as long as it is a frequency by which the response can be appropriately checked. For example, it is possible to adopt a frequency (0.25 Fs) of half of a Nyquist frequency. In addition, a certain range of the response is not particularly limited as long as it is a range by which it is possible to appropriately determine whether or not calibration is to be performed. For example, in the graph (III) of the frequency response that can be expected to be obtained when performing point image restoration processing on the calibration image, a range of 20%, preferably, 10% of the response at a certain frequency can be adopted as the certain range (IV) of the response.

The calibration control unit 246 receives the result of determination regarding whether or not calibration is required that has been performed by the calibration necessity determination unit 244. By transmitting a calibration execution command to the calibration execution unit 247 according to the determination regarding whether or not calibration is required that has been performed by the calibration necessity determination unit 244, the execution of calibration is controlled.

Under the control of the calibration control unit 246, the calibration execution unit 247 performs calibration of the parameters of point image restoration processing based on the calibration image. The result of the execution in the calibration execution unit 247 is returned to the image pickup unit 248, and is reflected in the point image restoration processing.

Next, the point image restoration processing performed by the point image restoration processing unit 229 (refer to FIG. 4) will be described with reference to FIGS. 7 and 8.

The image pickup device 100 includes the point image restoration processing unit 229 that performs point image restoration processing on the image captured by the image pickup unit 248. Then, the point image restoration processing unit 229 performs point image restoration processing using the parameters of point image restoration processing after calibration. Thus, by performing the point image restoration processing using the parameters of point image restoration processing after calibration, it is possible to perform point image restoration processing according to the individual variations in the image pickup device. Therefore, it is possible to obtain a captured image in which the individual variations in the image pickup device are reduced further.

Figure 7:
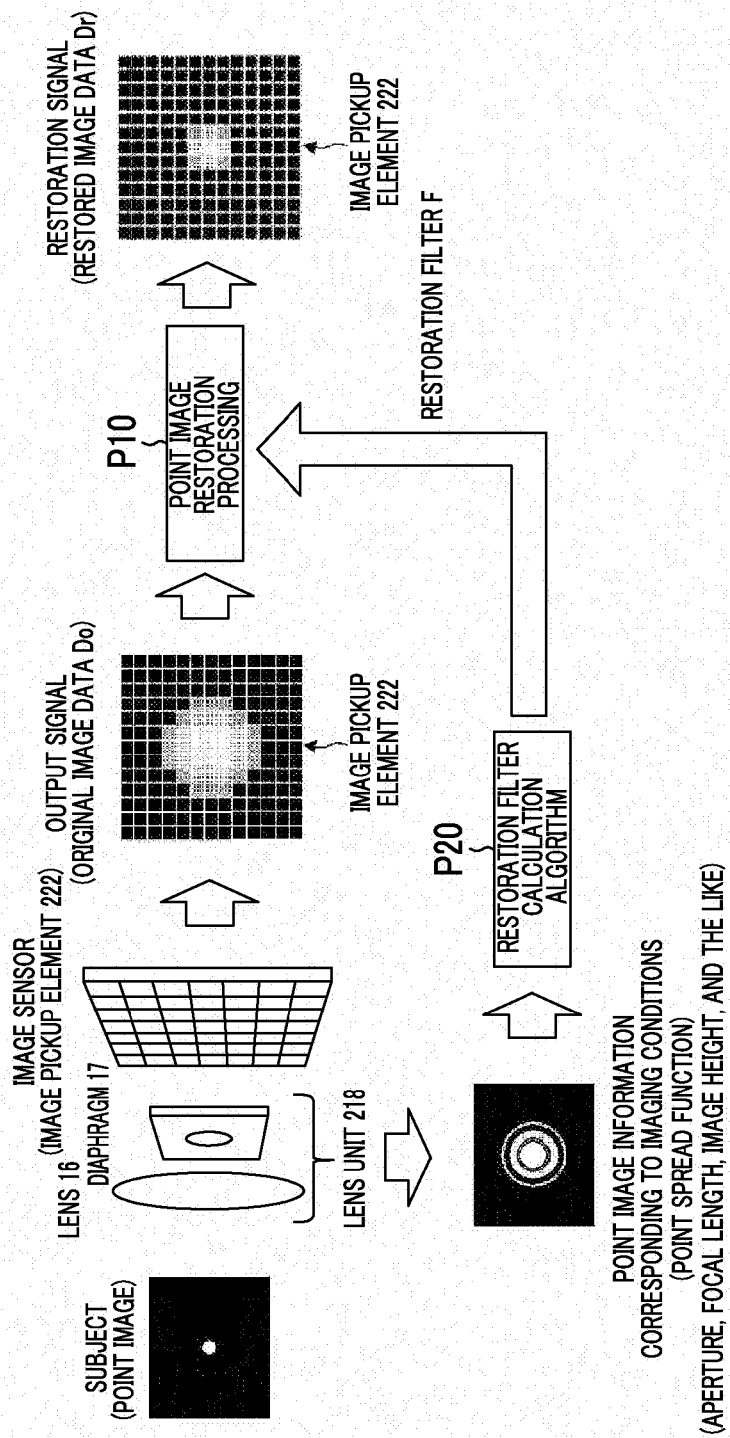
FIG. 7 is a diagram for explaining point image restoration processing.
Figure 8:
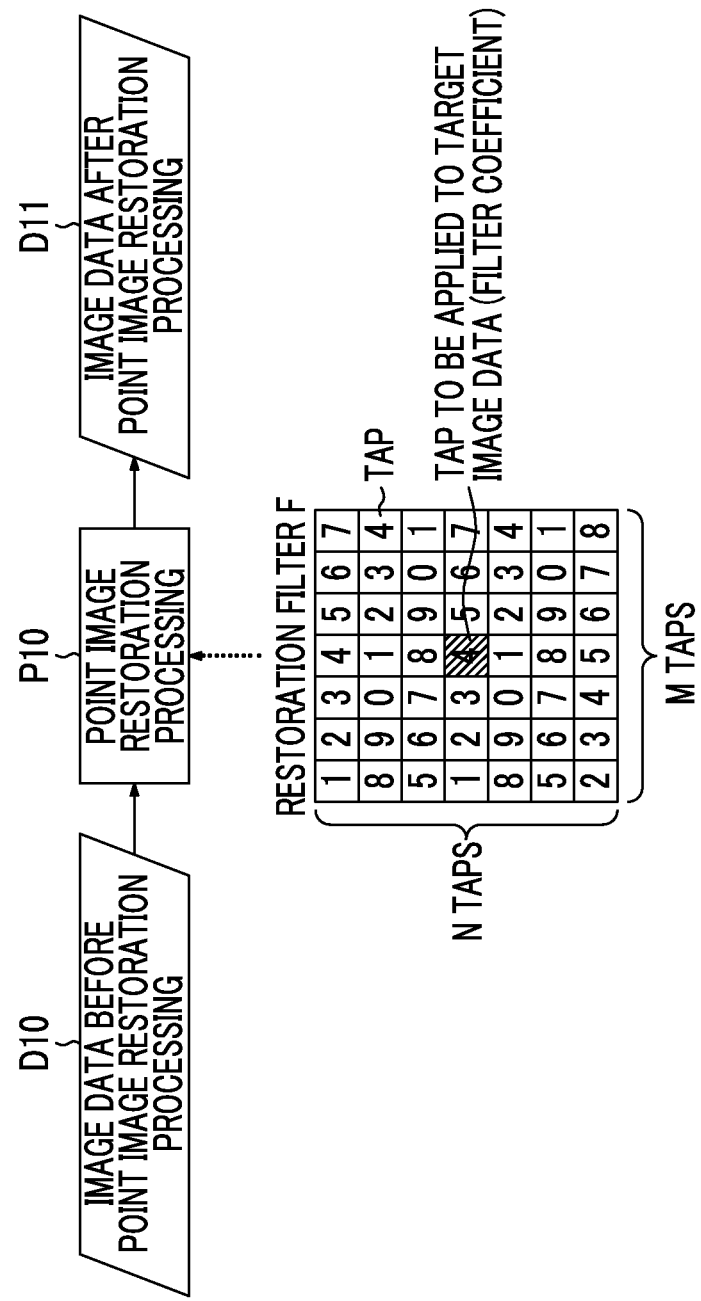
FIG. 8 is a diagram for explaining the point image restoration processing.

FIG. 7 is a diagram showing an outline from image capturing to point image restoration processing. When performing imaging with a point image as a subject, a subject image is received by the image pickup element 222 (image sensor) through the lens unit 218 (a lens, a diaphragm, and the like), and original image data Do is output from the image pickup element 222. The original image data Do becomes image data in a state in which the original subject image is blurred, by the point spread phenomenon due to the characteristics of the lens unit 218.

In order to restore the original subject image (point image) from the original image data Do of the blurred image, point image restoration processing P10 using a restoration filter F is performed on the original image data Do. As a result, restored image data Dr indicating an image (restored image) closer to the original subject image (point image) is obtained.

The restoration filter F used in the point image restoration processing P10 is obtained, from point image information (point spread function) of the lens unit 218 corresponding to the imaging conditions when acquiring the original image data Do, by a predetermined restoration filter calculation algorithm P20. The point image information (point spread function) of the lens unit 218 may change depending on not only the type of the lens but also various imaging conditions, such as the aperture amount, focal length, zoom amount, image height, the number of recording pixels, and a pixel pitch. Therefore, these imaging conditions are acquired when calculating the restoration filter F.

An outline regarding the point image restoration processing performed by the point image restoration processing unit 229 (refer to FIG. 4) will be described with reference to FIG. 8. FIG. 8 is a block diagram showing the outline of an example of the point image restoration processing. The point image restoration processing P10 is a process of creating image data after point image restoration processing D11 from image data before point image restoration processing D10 by filtering processing using the restoration filter F. That is, it is possible to calculate pixel data after point image restoration processing (image data after point image restoration processing D11) by applying the restoration filter F formed by N×M taps to image data to be processed and performing weighted average calculation between a filter coefficient assigned to each tap and the corresponding pixel data (pixel data to be processed and adjacent pixel data of the image data before point image restoration processing D10). By applying the weighted average processing using the restoration filter F to all pieces of pixel data, which form the image data, by changing the target pixel in order, it is possible to perform the point image restoration processing.

In the image pickup device 100, the image data before point image restoration processing D10 is image data of a calibration image. Then, the calibration execution unit 247 adjusts or calculates a filter coefficient based on the calibration image (image data before point image restoration processing D10). Thus, by calculating the filter coefficient based on the image data of the calibration image obtained by the image pickup unit 248 provided in each image pickup device 100, it is possible to calculate a filter coefficient suitable for each image pickup unit 248. Here, the calibration means adjusting the parameters relevant to the point image restoration processing in order to obtain a preferable captured image. For example, adjusting the filter coefficient may be mentioned.

Figure 9:
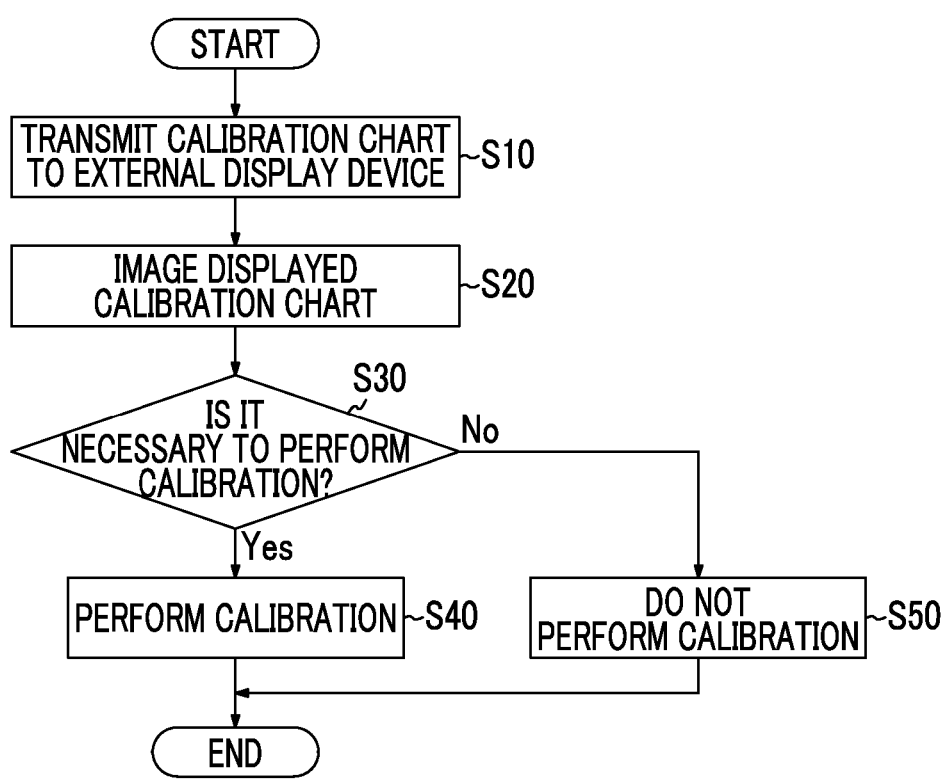
FIG. 9 is a diagram for explaining the operation of the image pickup device.

FIG. 9 is an operation flowchart of the image pickup device 100 of the present invention. First, the chart transmission control unit 242 of the image pickup device 100 selects a calibration chart stored in the chart storage unit 240, and transmits the calibration chart to the external display device 101 (step S10) (chart transmission control step). Then, the external display device 101 receives the calibration chart transmitted from the image pickup device 100.

Then, the calibration chart is displayed on the display unit 111 by the external display device 101. Then, the image pickup unit 248 of the image pickup device 100 images the calibration chart displayed on the display unit 111 (step S20). Then, based on the calibration image obtained by imaging the calibration chart using the image pickup unit 248, the calibration necessity determination unit 244 determines whether or not calibration of the parameters of point image restoration processing is required (step S30) (calibration necessity determination step).

Then, when it is determined that the calibration of the parameters of point image restoration processing is required (in case of Yes in step S30), the calibration control unit 246 transmits a calibration execution command to the calibration execution unit 247. The calibration execution unit 247 that has received the calibration execution command performs calibration of the parameters of point image restoration processing (step S40) (calibration execution step). On the other hand, when it is determined that the calibration of the parameters of point image restoration processing is not required (in case of No in step S30), the calibration control unit 246 does not output a calibration execution command and does not perform calibration of the parameters of point image restoration processing (step S50). In this example, when no calibration is performed, the calibration control unit 246 does not output a calibration execution command. However, the calibration control unit 246 may transmit a calibration execution command showing that calibration is not performed to the calibration execution unit 247.

By adopting the method described above, the burden on the user is reduced by performing calibration before the capturing of a captured image on which point image restoration processing is performed. Therefore, accurate calibration is realized. In addition, when performing calibration of the parameters of point image restoration processing according to the individual variations in the image pickup device 100, it is possible to perform calibration accurately while reducing the burden on the user. Therefore, it is possible to reduce the degradation of the captured image caused by the individual variations in the image pickup device 100.

In addition, since calibration is performed based on the determination of the calibration necessity determination unit 244 regarding whether or not calibration is required, it is possible to perform calibration accurately when the calibration is required. Therefore, it is possible to suppress individual variations in the obtained captured image in the image pickup device 100.

[Modification Example 1 of the Image Pickup Device]

Figure 10:
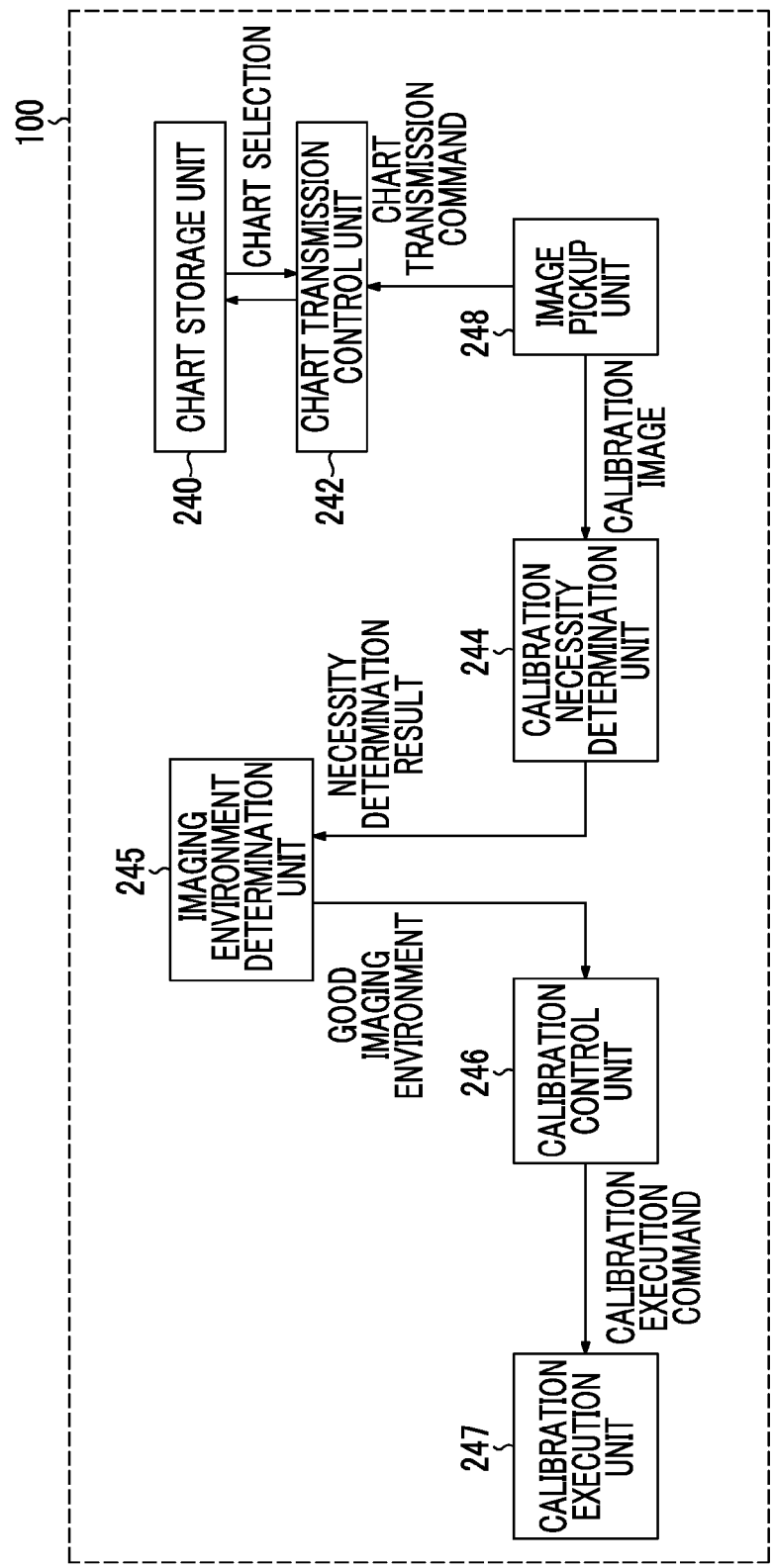
FIG. 10 is a block diagram of a main part in a modification example of the image pickup device.

FIG. 10 is a main part block diagram showing a main part in modification example 1 of the image pickup device 100. When the main part block diagram in the modification example 1 of the image pickup device 100 shown in FIG. 10 is compared with the main part block diagram showing the main part of the image pickup device 100 shown in FIG. 5, the modification example 1 of the image pickup device 100 described in FIG. 10 is different in that the imaging environment determination unit 245 is provided. In addition, the same main components as in the image pickup device 100 shown in FIG. 5 are denoted by the same reference numerals, and explanation thereof will be omitted.

The imaging environment determination unit 245 determines whether or not the imaging environment is suitable for the acquisition of a calibration image based on the calibration image, and the calibration control unit 246 controls the execution of calibration according to the determination of the imaging environment determination unit 245 regarding whether or not the imaging environment is suitable for the acquisition of a calibration image.

In the case of modification example 1 shown in FIG. 10, a result that calibration is required is transmitted to the imaging environment determination unit 245 from the calibration necessity determination unit 244. Then, the imaging environment determination unit 245 determines whether or not the imaging environment is suitable.

Specifically, when the result of necessity determination is that calibration is required, the imaging environment determination unit 245 that has acquired the calibration image and the necessity determination determines whether or not the imaging environment is suitable for the acquisition of a calibration image based on the acquired calibration image. For the determination regarding whether or not the imaging environment is suitable for the acquisition of a calibration image, it is possible to adopt various methods. For example, feature points in the calibration image are extracted. When it is determined that the calibration chart is tilted or deviated, the image pickup device 100 is tilted, or the like, a warning sign is displayed on the display unit 111 of the external display device 101. In addition, when performing warning display, a warning sign is transmitted to the chart transmission control unit 242 from the imaging environment determination unit 245, and is transmitted to the external display device 101 by the chart transmission control. The warning sign may be displayed on the check image display unit 225 provided in the image pickup device 100.

FIG. 11 shows a case in which a warning sign is displayed on the check image display unit 225. That is, in FIG. 11, a calibration chart is displayed on the display unit 111 of the external display device 101. Then, the calibration chart is imaged by the image pickup unit 248 in the image pickup device 100, thereby acquiring a calibration image. Then, the imaging environment determination unit 245 determines that the camera faces downward, and a warning sign is displayed on the check image display unit 225.

Figure 12:
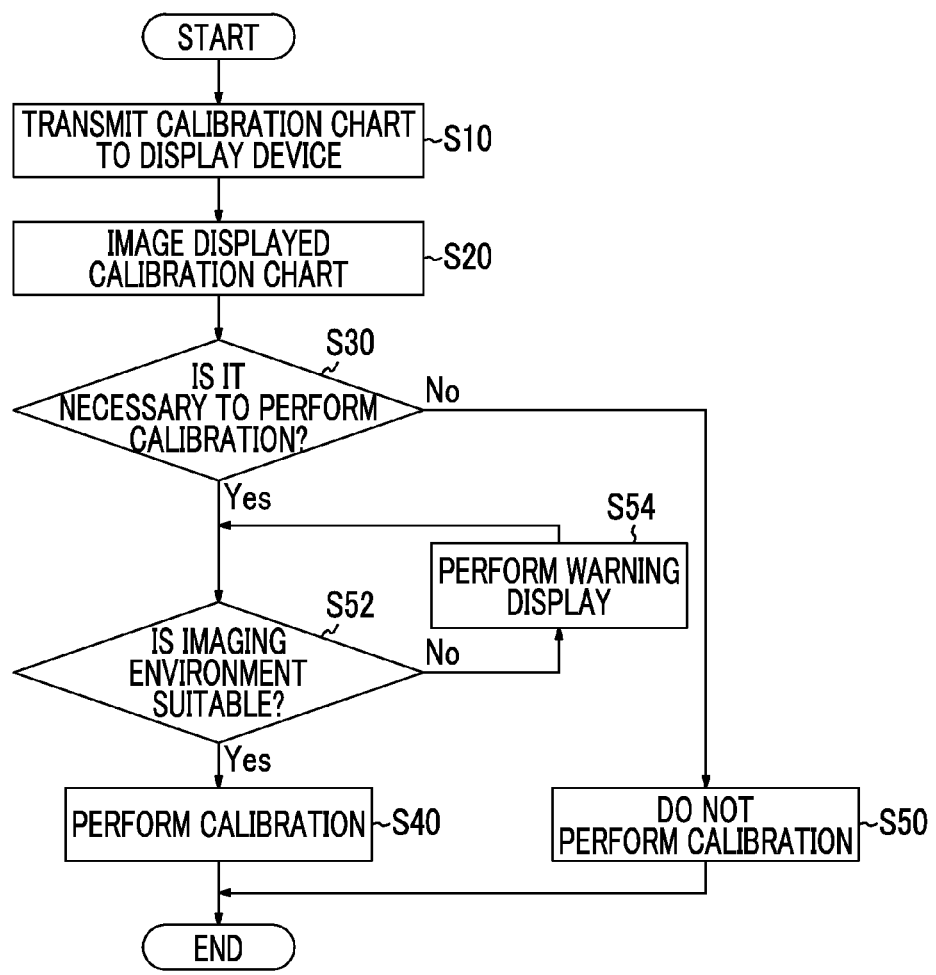
FIG. 12 is a diagram for explaining the operation in the modification example of the image pickup device.

FIG. 12 shows an operation flowchart in the modification example 1 of the image pickup device 100 shown in FIG. 10. In addition, the same portions as in the operation flowchart shown in FIG. 9 are denoted by the same reference numerals, and explanation thereof will be omitted. When the operation flowchart in the modification example 1 described in FIG. 12 is compared with the operation flowchart described in FIG. 9, the operation flowchart in the modification example 1 described in FIG. 12 is different in that the imaging environment is determined (step S52) and warning display is performed (step S54). When the calibration necessity determination unit 244 determines that it is necessary to perform calibration (in case of Yes in step S30), the imaging environment determination unit 245 determines whether or not the imaging environment is suitable. Then, when the imaging environment is suitable (in case of Yes in step S52), the calibration control unit 246 transmits a calibration execution command to the calibration execution unit 247 in order to perform calibration. On the other hand, when the imaging environment is not suitable (in case of No in step S52), a warning sign is displayed on the display unit 111 or on the check image display unit 225 (step S54).

In addition, when the image pickup device 100 includes the imaging environment determination unit 245, the chart storage unit 240 may further have an environment determination chart. Here, the environment determination chart refers to a chart by which it is possible to check whether or not the imaging environment when imaging a calibration chart is suitable. The environment determination chart is not particularly limited as long as it is possible to check whether or not the imaging environment is suitable. For example, one side gray environment determination chart can be considered. Through the one side gray environment determination chart, it is checked whether or not the display unit 111 is lit by spotlight.

When a calibration chart, and an environment determination chart are stored in the chart storage unit 240, the imaging environment determination unit 245 determines whether or not the imaging environment is suitable for the acquisition of a calibration image based on the environment determination image obtained by imaging the environment determination chart using the image pickup unit 248 or based on the environment determination image and the calibration image. In addition, the imaging environment determination unit 245 can determine whether or not the imaging environment is suitable through the calibration image or the environment determination image.

Figure 13:
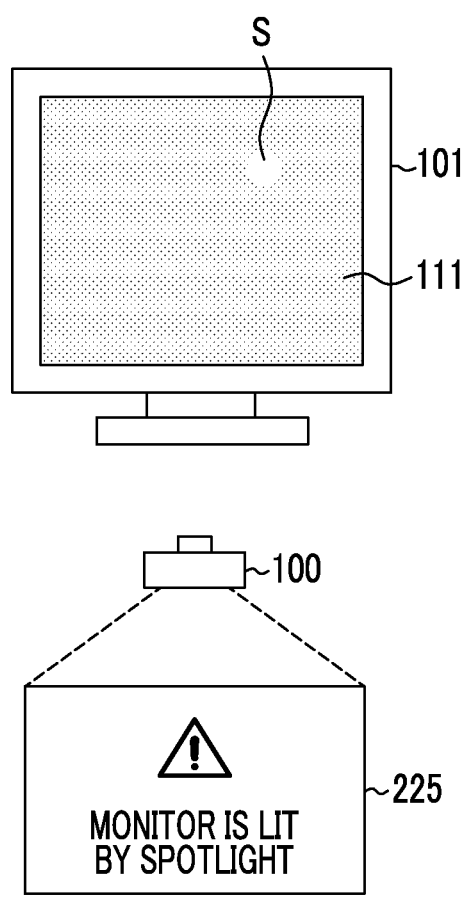
FIG. 13 is a diagram for explaining a modification example of the image pickup device.

FIG. 13 shows a case in which a warning sign when using an environment determination chart is displayed on the check image display unit 225. That is, in FIG. 13, an environment determination chart is displayed on the display unit 111 of the external display device 101. Then, the environment determination chart is imaged by the image pickup unit 248 (refer to FIG. 4) in the image pickup device 100, thereby acquiring an environment determination image. Then, the imaging environment determination unit 245 determines that the display unit 111 is lit by spotlight S, and a warning sign is displayed on the check image display unit 225.

By adopting the configuration in the modification example 1 of the image pickup device, it is possible to determine whether or not the imaging environment is suitable for the acquisition of a calibration image for more various conditions. In addition, by adopting the configuration in the modification example 1 of the image pickup device, it is possible to acquire a calibration image under the imaging environment that is suitable for the acquisition of a more accurate calibration image. As a result, it is possible to perform more accurate calibration.

[Modification Example 2 of the Image Pickup Device]

In modification example 2 of the image pickup device 100, it is determined, based on a plurality of calibration images, whether or not the imaging environment is suitable for the acquisition of a calibration image. That is, the image pickup unit 248 acquires a plurality of calibration images by imaging a plurality of calibrations charts, and the imaging environment determination unit 245 determines whether or not the imaging environment is suitable based on the plurality of acquired calibration images. The imaging environment determination unit 245 may also determine whether or not the imaging environment is suitable for the acquisition of a calibration image based on a plurality of environment determination images or based on one or a plurality of environment determination images and one or a plurality of calibration images.

Figure 14:
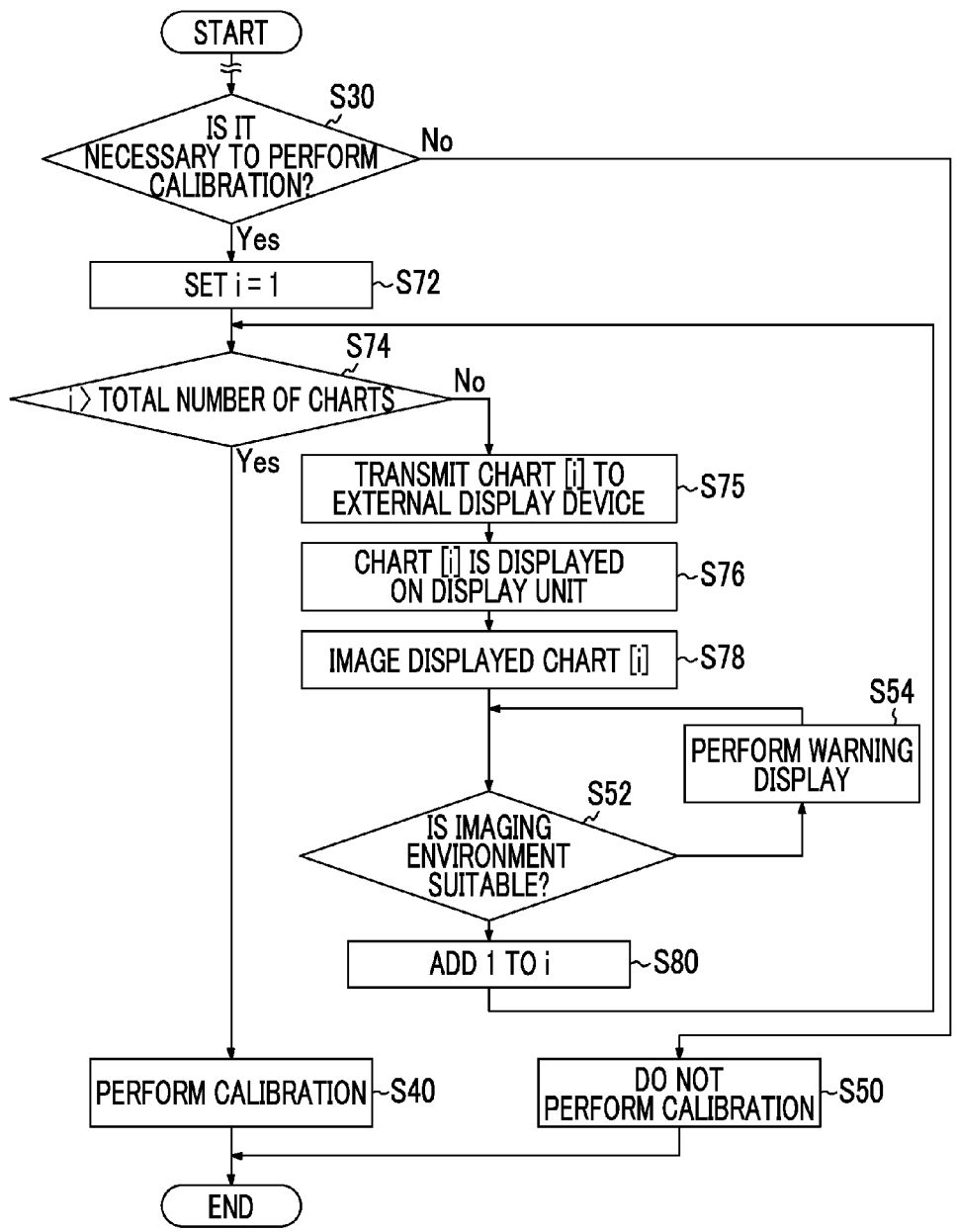
FIG. 14 is a diagram for explaining the operation in the modification example of the image pickup device.

FIG. 14 shows an operation flowchart in the modification example 2 of the image pickup device 100. In addition, the same portions as in FIG. 9 or 12 are denoted by the same reference numerals, and explanation thereof will be omitted. FIG. 14 shows an operation flow after the determination regarding whether or not it is necessary to perform calibration (step S30). Since the operation (steps S10 and S20 in FIG. 9) before the determination regarding whether or not it is necessary to perform calibration (step S30) is the same as that shown in FIG. 9, the operation is omitted in FIG. 14.

In the modification example 2 of the image pickup device 100 described in FIG. 14, when the calibration necessity determination unit 244 determines that it is necessary to perform calibration (in case of Yes in step S30), the count i of a counter in the imaging environment determination unit 245 is set to 1. Then, the imaging environment determination unit 245 determines whether or not the count i of the counter is larger than the total number of transmitted charts (imaging environment charts, calibration charts) by which it is possible to determine the imaging environment. When the count i is not larger than the total number of transmitted charts (in case of No in step S74), an [i]-th chart is transmitted to the external display device 101 by the chart transmission control unit 242 (step S75), and the [i]-th chart is displayed (step S76). Then, the displayed [i]-th chart is imaged by the image pickup unit 248 (step S78). Then, the imaging environment determination unit 245 determines whether or not the imaging environment is suitable based on the acquired imaging environment image and/or the acquired calibration image (step S52). Then, when the imaging environment is suitable (in case of Yes in step S52) in the determination regarding whether or not the imaging environment is suitable (step S52), the count i is incremented (+1) (step S80).

On the other hand, when the count i is larger than the total number of transmitted charts (in case of Yes in step S74), calibration is performed (step S40).

By adopting the configuration in the modification example 2 of the image pickup device, it is possible to acquire a calibration image under the imaging environment that is suitable for the acquisition of a more accurate calibration image. As a result, it is possible to perform more accurate calibration.

[Modification Example 3 of the Image Pickup Device]

Figure 15:
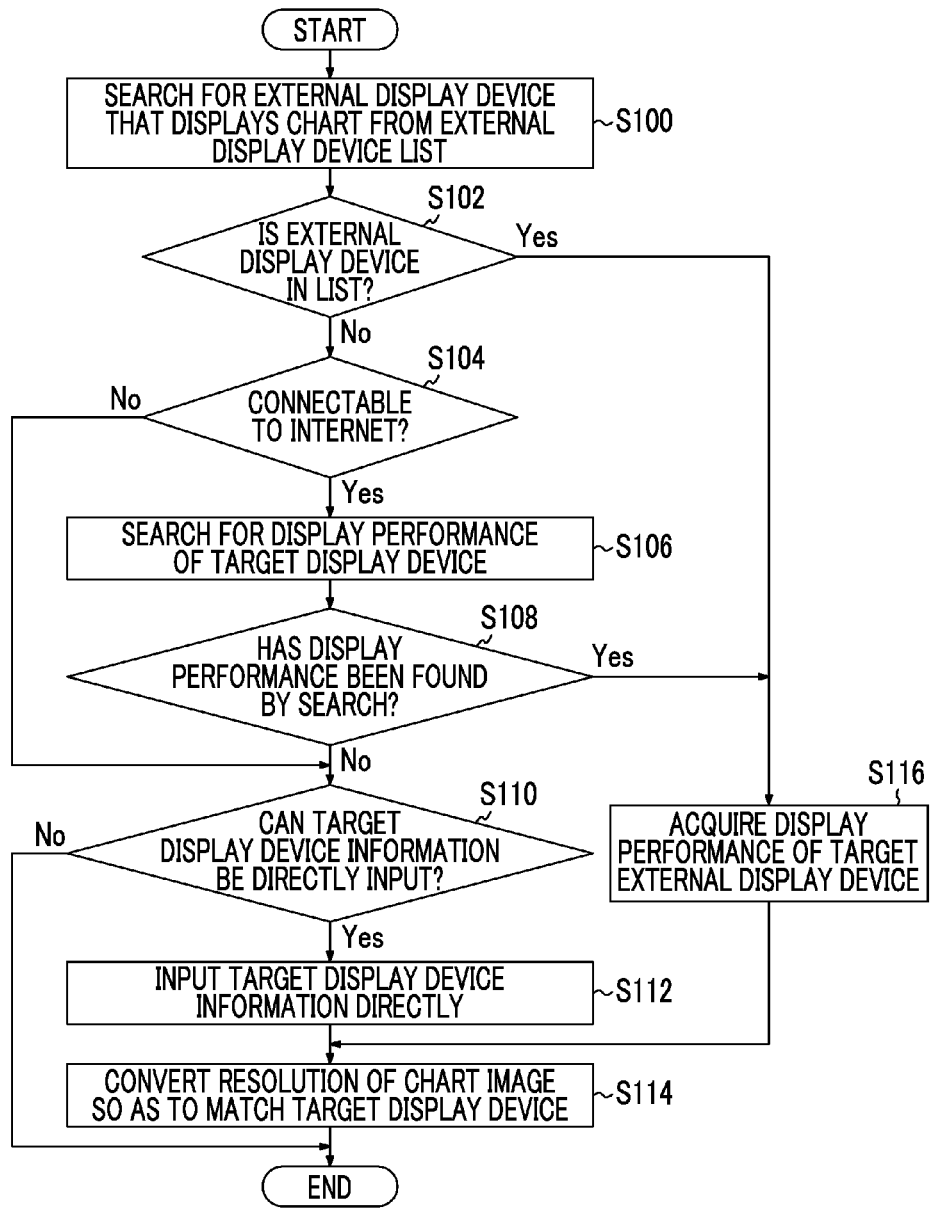
FIG. 15 is a diagram for explaining the operation in the modification example of the image pickup device.

In modification example 3 of the image pickup device 100, the chart transmission control unit 242 acquires information regarding the display performance of the external display device 101, and transmits a calibration chart corresponding to the display performance to the external display device 101. FIG. 15 is a diagram showing an operation flow when the image pickup device 100 acquires the display performance of the external display device 101.

In the image pickup device 100 in the modification example 3, the chart transmission control unit 242 has an external display device list. In addition, the external display device list is not particularly limited to being stored in the chart transmission control unit 242. Here, the external display device list refers to a list in which a model number or a product name, by which the external display device 101 can be identified, and the display performance of the external display device 101 are associated with each other. If the external display device 101 is identified and the external display device 101 is in the list, the image pickup device 100 can check the display performance of the external display device 101. First, whether or not the external display device 101 that displays a chart is in the external display device list stored in the chart transmission control unit 242 is searched for (step S100). Then, the chart transmission control unit 242 determines whether or not the target external display device 101 is in the external display device list. When the target external display device 101 is in the external display device list (in case of Yes in step S102), the chart transmission control unit 242 acquires information regarding the display performance of the target external display device 101. Here, the target external display device 101 refers to a display device to which a chart from the chart transmission control unit 242 is transmitted.

On the other hand, when there is no target external display device 101 in the external display list (in case of No in step S102), the chart transmission control unit 242 determines whether or not connection to the Internet is possible in an environment where the image pickup device 100 is present (step S104). When it is determined that connection to the Internet is possible (in case of Yes in step S104), the display performance of the target external display device 101 is searched for on the Internet (step S106). Then, when the display performance is found by the search (in case of Yes in step S108), the display performance of the target external display device 101 is acquired. On the other hand, when the display performance of the target external display device 101 is not found by the search (in case of No in step S108), it is determined whether or not the display performance of the target external display device 101 can be directly input (step S110). Also when connection to the Internet is not possible (in case of No in step S104), it is determined whether or not the display performance of the target external display device 101 can be directly input (step S110). Here, when directly inputting the display capability of the external display device 101 in the image pickup device 100, for example, the display capability of the external display device 101 is input through the operation unit 214. Then, when the display performance of the target external display device 101 can be directly input (in case of Yes in step S110), the display capability of the target external display device 101 is directly input (step S112). Then, the resolution of the chart is converted so as to match the display capability of the target external display device 101 (step S114). Also after acquiring the display performance of the target external display device 101 (step S116), the resolution of the chart is converted so as to match the display capability of the target external display device 101 (step S114). On the other hand, when the display performance of the target external display device 101 cannot be directly input (in case of No in step S110), the display capability of the target external display device 101 is not acquired. After the operation flow shown in FIG. 15 is ended, the operation flow shown in FIG. 9 is started to perform calibration necessity determination or calibration.

Since the calibration chart is displayed more accurately on the external display device by adopting the method of the modification example 3 of the image pickup device, it is possible to acquire a more appropriate calibration image.

[Modification Example 4 of the Image Pickup Device]

In modification example 4 of the image pickup device 100, the image pickup unit 248 has a bracketing imaging mode, and the calibration execution unit 247 selects a bracketing imaging mode and performs calibration of the parameters of point image restoration processing based on a plurality of calibration images captured by the image pickup unit 248.

Here, the bracketing imaging mode refers to changing the imaging conditions automatically to continuously image the same subject. The imaging conditions in this case mean an F value (aperture value), a zoom position (focal length), a subject distance, and the like. Since the parameters of point image restoration processing differ depending on the imaging conditions or the like, the acquisition of a calibration image is preferably performed for each of the imaging conditions. In particular, for the F value (aperture value), it is desirable to perform calibration for each different value. This is because, in the capturing of a calibration image, the brightness changes if the F value (aperture value) changes and this greatly affects the accuracy of the calibration. Parameters of the point image restoration processing differ depending on the imaging conditions. Accordingly, when capturing a calibration image for each of the imaging conditions, a large amount of imaging should be performed while changing the imaging conditions. This imposes a significantly large burden on the user, and tends to lower the imaging accuracy of a calibration image. Therefore, by capturing a calibration image using bracketing imaging, the user can easily capture the calibration image for each of the imaging conditions, and the lowering of the imaging accuracy can be suppressed.

Figure 1:
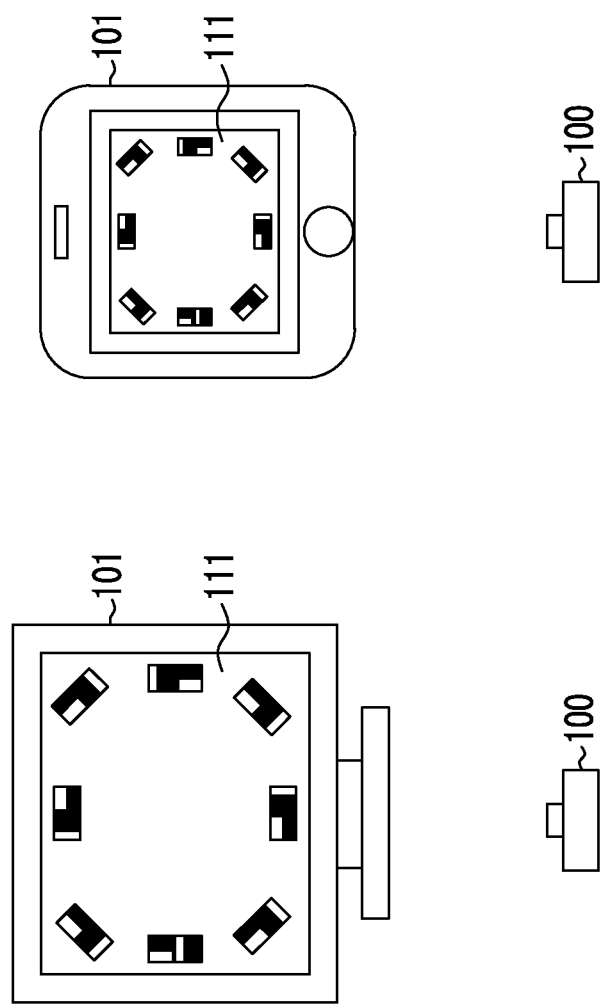
FIGS. 1(A) and 1(B) are diagrams for explaining the imaging of a calibration chart by an image pickup device of the present invention.

In the case of a bracketing imaging mode, the image pickup unit 248 is synchronized with the external display device 101, so that the image pickup unit 248 images a calibration chart that is displayed in synchronization with the external display device 101 according to the imaging of the image pickup unit 248 in the bracketing imaging mode (refer to FIG. 1).

When the image pickup unit 248 performs imaging in the bracketing imaging mode, a synchronous control signal is transmitted from the chart transmission control unit 242 of the image pickup device 100 to the chart receiving unit 270 of the external display device 101 in order to perform control to sequentially display calibration images on the external display device (refer to FIG. 1). In addition, the means for transmission of a calibration chart by the chart transmission control unit 242 is not particularly limited. For example, the calibration chart may be transmitted from the chart transmission control unit 242 to the external display device 101 through radio communication, or the calibration chart may be transmitted from the chart transmission control unit 242 to the chart receiving unit 270 of the external display device 101 using an external memory, such as an SD card.

Without being limited to such a form, the image pickup device 100 and the external display device 101 may be connected to each other, for example, through a communication cable such as a high-definition multimedia interface (HDMI®) cable, calibration images may be sequentially transmitted from the image pickup device 100 to the external display device 101, and the external display device 101 may sequentially display the received calibration images. That is, imaging in the bracketing imaging mode and calibration chart switching control may be performed using the image pickup device 100. In this case, a common external display device 101 can be used as the external display device 101. For example, since it is possible to display a calibration chart with high accuracy by using a high-resolution television corresponding to 4K2K, it is possible to perform calibration more accurately.

Figure 16:
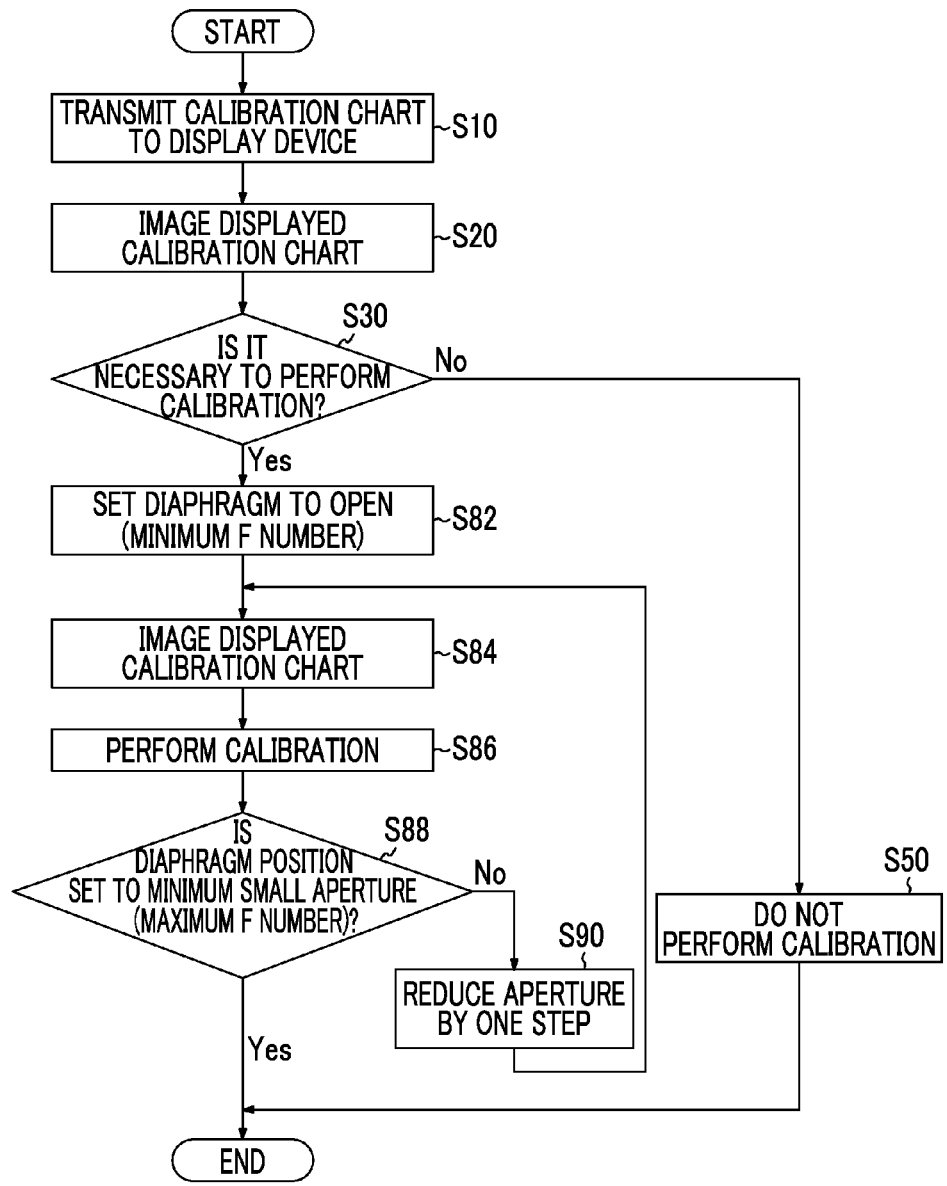
FIG. 16 is a diagram for explaining the operation in the modification example of the image pickup device.

FIG. 16 shows an operation flowchart in the modification example 4 of the image pickup device 100. In addition, the same portions as in FIG. 9 are denoted by the same reference numerals, and explanation thereof will be omitted. It is determined whether or not it is necessary to perform calibration (step S30). When it is necessary to perform calibration (in case of Yes in step S30), a diaphragm is first set to the maximum open position (minimum F number) (step S82). Then, the image pickup unit 248 images a calibration chart displayed on the external display device 101 to acquire a calibration image. The calibration chart displayed on the external display device 101 may be changed according to the diaphragm position (F number: F value), or may not be changed. Then, based on the acquired calibration image, the calibration execution unit 247 calibrates the parameters of point image restoration processing. Then, the image pickup unit 248 determines whether or not the diaphragm position is set to the minimum small aperture (maximum F number) (step S88). When the diaphragm position is set to the minimum small aperture (in case of No in step S88), the aperture is further reduced by one step (step S90). Then, the displayed calibration chart is imaged again by the image pickup unit 248. On the other hand, when the diaphragm position is set to the minimum small aperture (in case of Yes in step S88), the process ends. Although the calibration is sequentially performed after acquiring the calibration image in FIG. 16, the present invention is not particularly limited thereto. For example, calibration of the parameters of point image restoration processing may be performed after acquiring a plurality of calibration images.

By adopting the method of the modification example 4 of the image pickup device 100, it is possible to reduce the burden on the user since it is possible to automatically acquire a plurality of calibration images. In addition, since the calibration of the parameters of point image restoration processing is performed based on a plurality of calibration images, it is possible to perform more accurate calibration.

[Modification Example 5 of the Image Pickup Device]

In modification example 5 of the image pickup device 100, the image pickup unit 248 has a bracketing imaging mode, and the calibration execution unit 247 selects a bracketing imaging mode and performs calibration of the parameters of point image restoration processing based on a plurality of calibration images captured by the image pickup unit 248. In the modification example 5 of the image pickup device 100, a plurality of calibration images are acquired by imaging a plurality of calibrations charts under one condition.

Figure 17:
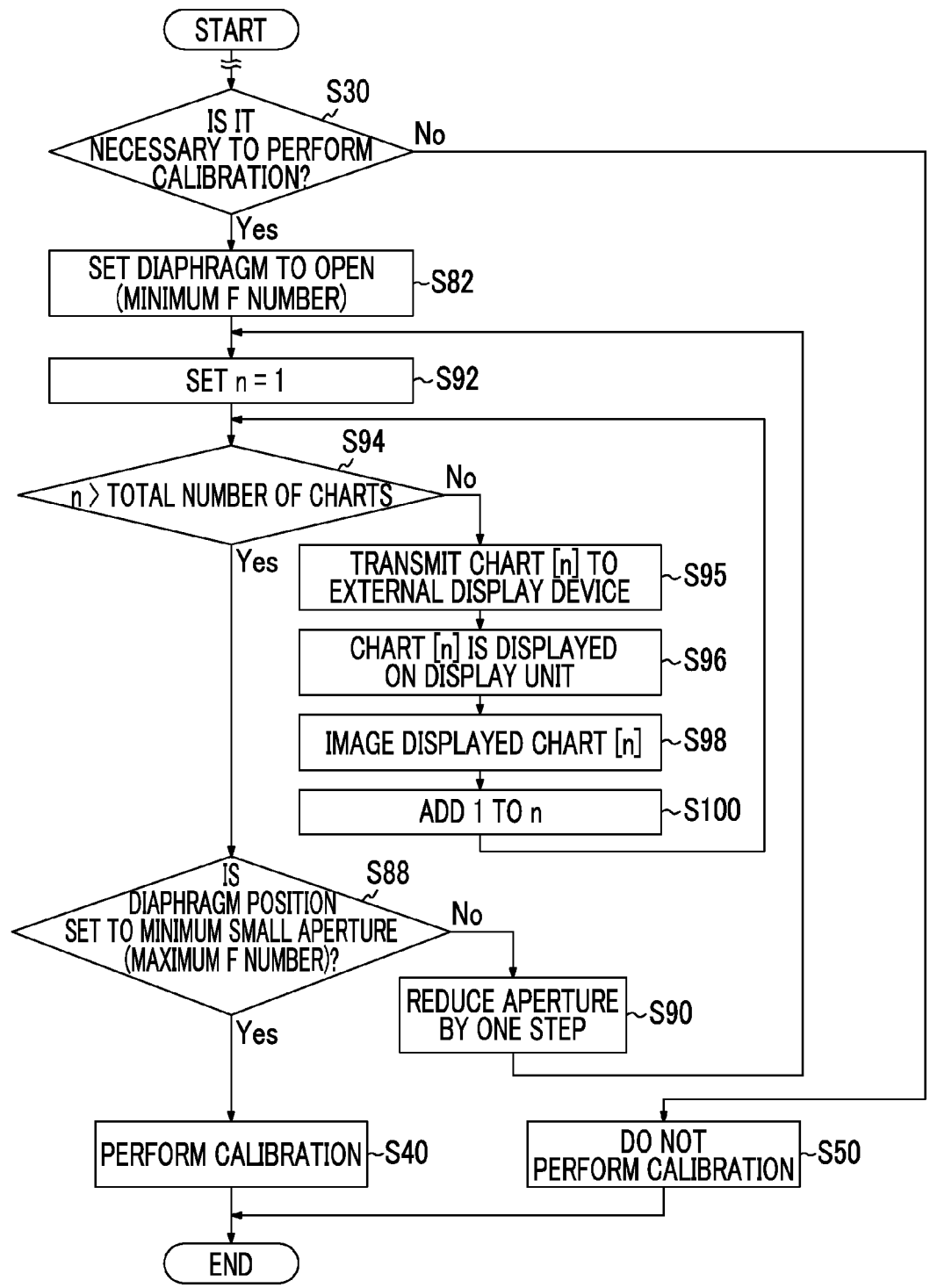
FIG. 17 is a diagram for explaining the operation in the modification example of the image pickup device.

FIG. 17 shows an operation flowchart in the modification example 5 of the image pickup device 100. In addition, the same portions as in FIGS. 9 and 16 are denoted by the same reference numerals, and explanation thereof will be omitted. FIG. 17 shows an operation flow after the determination regarding whether or not it is necessary to perform calibration (step S30). Since the operation (steps S10 and S20 in FIG. 9) before the determination regarding whether or not it is necessary to perform calibration (step S30) is the same as that shown in FIG. 9, the operation is omitted in FIG. 17.

In the modification example 5 of the image pickup device 100, when the calibration necessity determination unit 244 determines that it is necessary to perform calibration (Yes in step S30), the image pickup unit 248 sets the diaphragm position to the maximum open position (minimum F number) (step S82). Then, the count n of the counter in the image pickup unit 248 is set to 1 (step S92). Then, the image pickup unit 248 determines whether or not the count n is larger than the total number of calibration charts transmitted to the external display device 101 (step S94).

Then, when the count n of the counter in the image pickup unit 248 is not larger than the total number of calibration charts transmitted to the external display device 101 (in case of No in step S94), the n-th calibration chart is transmitted to the external display device 101 (step S95), and the n-th transmitted chart is displayed on the external display device 101 (step S96). Then, the calibration chart displayed on the external display device 101 is imaged by the image pickup unit 248 (step S98). Then, the count n of the counter in the image pickup unit 248 is incremented by 1 (step S100). Then, it is determined again whether or not the count n is larger than the total number of transmitted calibration charts (step S94).

When it is determined that the count n of the counter in the image pickup unit 248 is larger than the total number of transmitted calibration charts, the image pickup unit 248 determines whether or not the diaphragm position is set to the minimum small aperture (maximum F number).

By adopting the method of the modification example 5 of the image pickup device 100, it is possible to reduce the burden on the user since it is possible to automatically acquire a plurality of calibration images. In addition, since the calibration of the parameters of point image restoration processing is performed based on a plurality of calibration images, it is possible to perform more accurate calibration.

Other Embodiments

Figure 18:
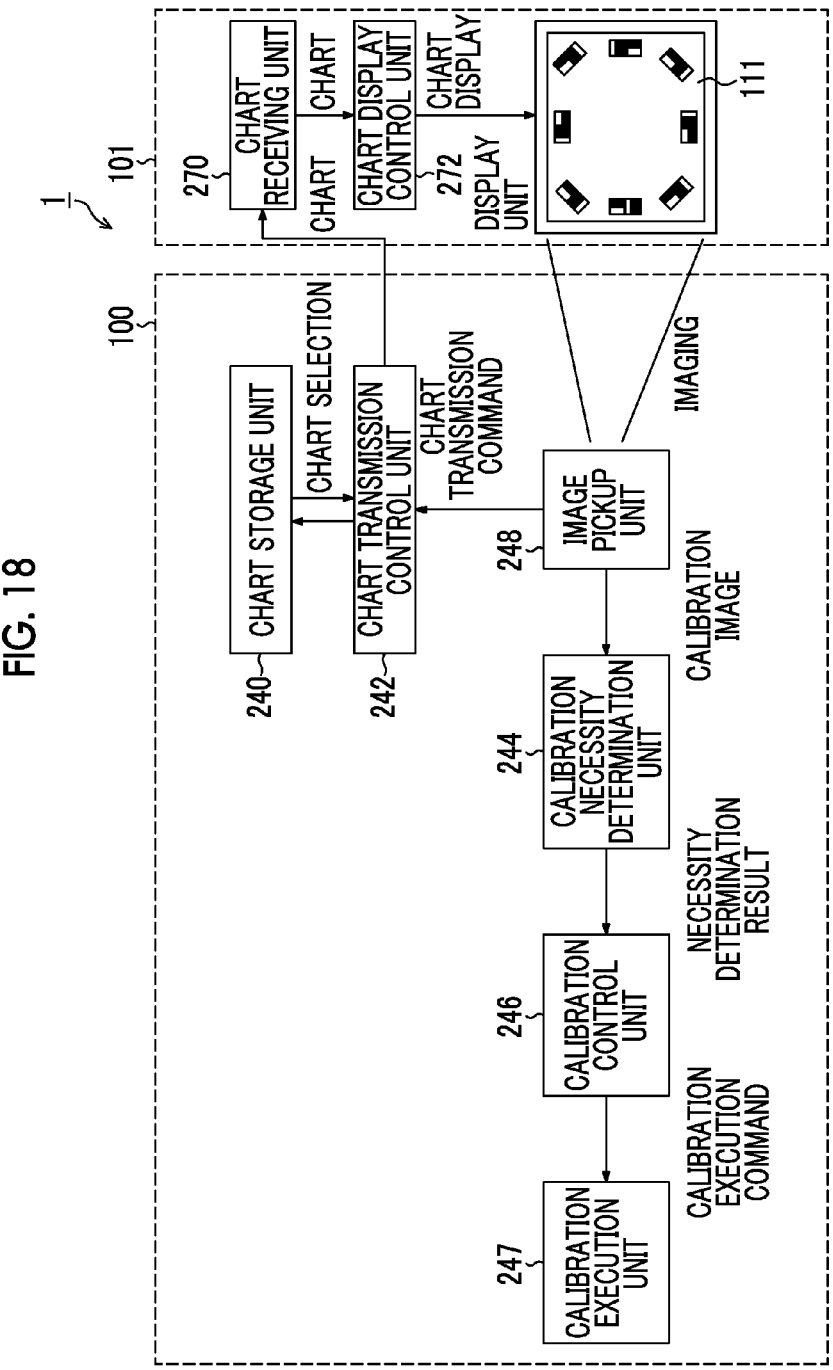
FIG. 18 is a block diagram of a main part of a calibration system.

As another embodiment of the present invention, a calibration system 1 can be mentioned. FIG. 18 is a main part block diagram showing the main part of the calibration system 1 that is another embodiment of the present invention. That is, FIG. 18 illustrates the calibration system 1 that includes the image pickup device 100 and the external display device 101 and performs calibration of the parameters of point image restoration processing. The image pickup device 100 mainly includes the chart storage unit 240, the chart transmission control unit 242, the calibration necessity determination unit 244, the calibration control unit 246, the calibration execution unit 247, and the image pickup unit 248. The overall operation of the image pickup device 100 is controlled by the central processing unit (CPU) 212 (refer to FIG. 4). In addition, the external display device 101 mainly includes the chart receiving unit 270, a chart display control unit 272, and the display unit 111. Since the image pickup device 100 is the same as that shown in FIG. 5, the image pickup device 100 is denoted by the same reference numerals, and explanation thereof will be omitted.

The chart transmission control unit 242 of the image pickup device 100 selects a calibration chart stored in the chart storage unit 240, and transmits the selected calibration chart to the external display device 101. When the execution of calibration is instructed through the operation unit 214 (refer to FIG. 4) in the image pickup unit 248, an instruction to select and transmit a calibration chart is output from the CPU 212 in the image pickup unit 248 to the chart transmission control unit 242. The calibration chart selection and transmission instruction given to the chart transmission control unit 242 is not limited to being output from the CPU 212 in the image pickup unit 248.

In the case shown in FIG. 18, the chart transmission control unit 242 transmits a calibration chart to the chart receiving unit 270 of the external display device 101. Here, the chart transmission means of the chart transmission control unit 242 is not particularly limited. For example, a calibration chart may be transmitted from the chart transmission control unit 242 to the chart receiving unit 270 of the external display device 101 through radio communication. In addition, a calibration chart may be transmitted from the chart transmission control unit 242 to the chart receiving unit 270 of the external display device 101 by using an external memory, such as an SD card.

The calibration chart transmitted from the chart transmission control unit 242 is received by the chart receiving unit 270 of the external display device 101. Then, the chart receiving unit 270 transmits the calibration chart to the chart display control unit 272. Then, the calibration chart is displayed on the display unit 111 by the chart display control unit 272.

<Example of Application to an EDoF System>

The point image restoration processing performed using the parameters of the point image restoration processing in the above description is image processing for restoring an original subject image by restoring and modifying the point spread (point image blur) according to the specific imaging conditions (for example, an aperture value, a focal length, and a lens type), but image processing to which the present invention can be applied is not limited to the point image restoration processing in the embodiment described above. For example, the point image restoration processing according to the present invention can also be applied to point image restoration processing on image data acquired by the imaging of the image pickup unit 248 that includes an optical system having an extended depth of field (focus) (EDoF). By performing the point image restoration processing on image data of a blurred image acquired by imaging in a state in which the depth of field (depth of focus) is extended by the EDoF optical system, it is possible to restore and generate high-resolution image data that is in focus over a wide range. In this case, point image restoration processing using a restoration filter, which is a restoration filter based on the point spread function (PSF, OTF, MTF, PTF, or the like) of the EDoF optical system and which has a filter coefficient that is set such that satisfactory image restoration is possible within the range of the extended depth of field (depth of focus), is performed.

Hereinafter, an example of a system (EDoF system) for restoration of image data acquired by imaging through the EDoF optical system will be described. Also in the example shown below, point image restoration processing is performed on a brightness signal (brightness signal Y) obtained from the image data (RGB data) after demosaic processing.

Figure 19:
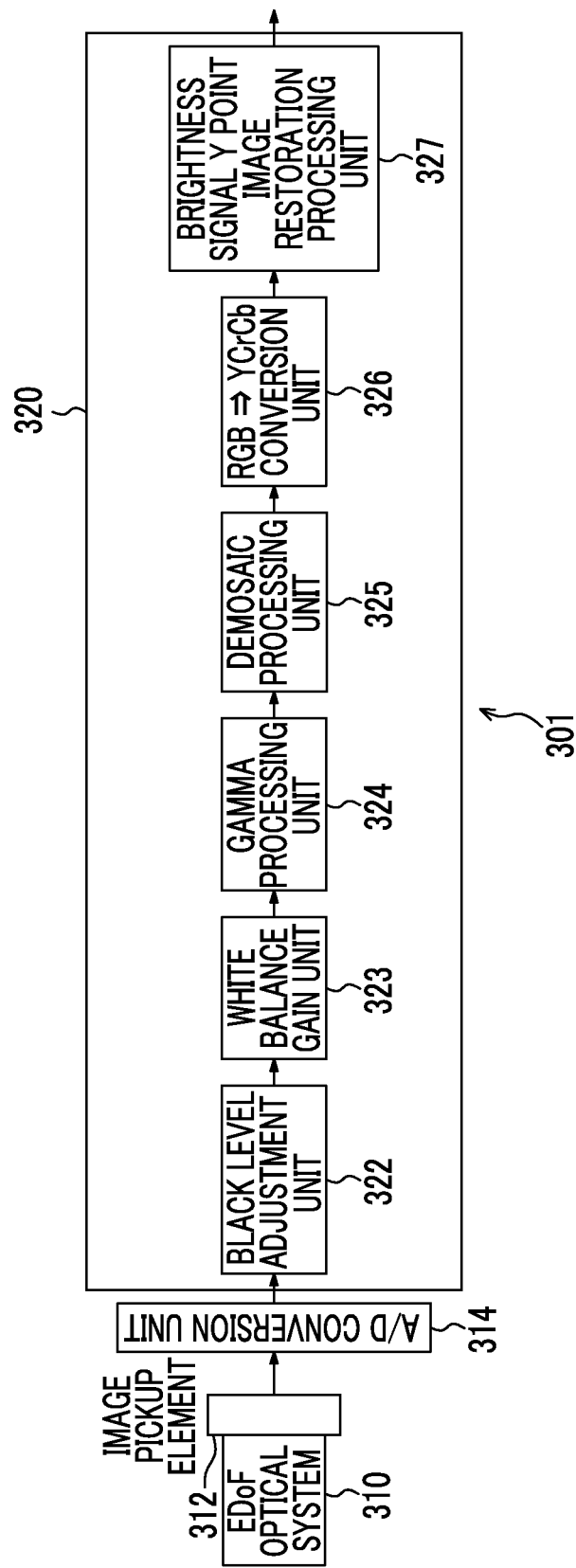
FIG. 19 is a block diagram showing one form of an imaging module including an EDoF optical system.

FIG. 19 is a block diagram showing one form of an imaging module 301 including an EDoF optical system. The imaging module (digital camera or the like) 301 in this example includes an EDoF optical system (lens unit) 310, an image pickup element 312, an AD conversion unit 314, and a point image restoration processing block (image processing unit) 320.

Figure 20:
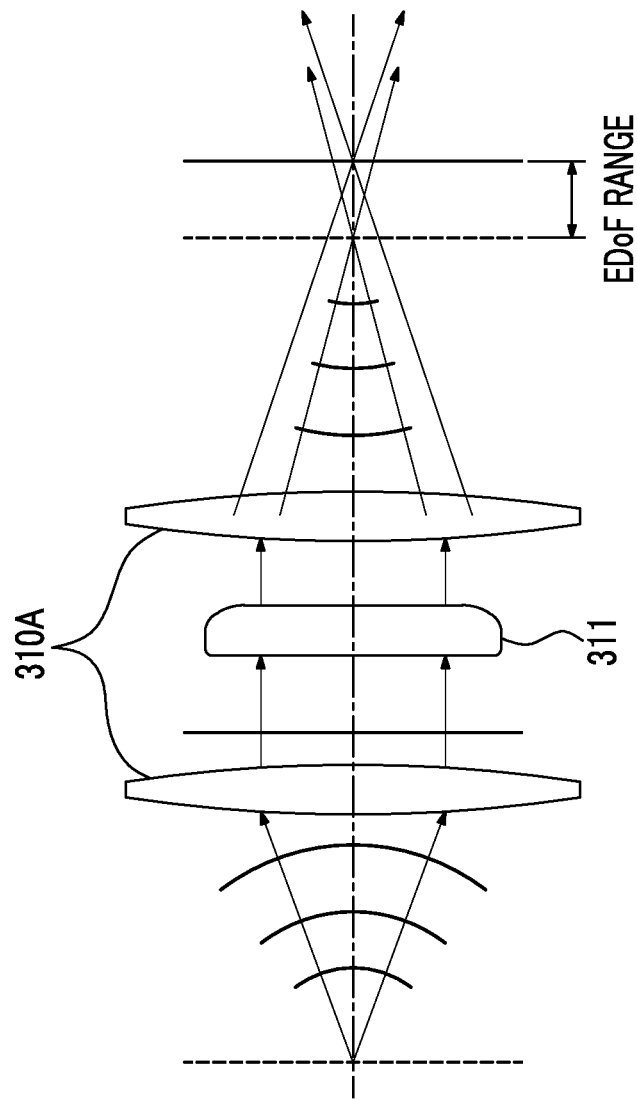
FIG. 20 is a diagram showing an example of the EDoF optical system.

FIG. 20 is a diagram showing an example of the EDoF optical system 310. The EDoF optical system 310 in this example includes a monofocal fixed imaging lens 310A and an optical filter 311 disposed at a pupil position. The optical filter 311 is intended to modulate the phase, and performs an operation for the EDoF of the EDoF optical system 310 (imaging lens 310A) so that the extended depth of field (depth of focus) (EDoF) is obtained. Thus, the imaging lens 310A and the optical filter 311 form an imaging lens unit that extends the depth of field by modulating the phase.

The EDoF optical system 310 may include other components as necessary. For example, a diaphragm (not shown) is disposed near the optical filter 311. One optical filter 311 may be used, or a plurality of optical filters 311 may be used in combination. The optical filter 311 is only an example of the optical phase modulation means, and the EDoF of the EDoF optical system 310 (imaging lens 310A) may be realized by other means. For example, instead of providing the optical filter 311, the EDoF of the EDoF optical system 310 may be realized by the imaging lens 310A that is designed so as to have the same function as the optical filter 311 in this example.

That is, it is possible to realize the EDoF of the EDoF optical system 310 by various kinds of means for changing the wavefront of imaging onto the light receiving surface of the image pickup element 312. For example, an "optical element having a thickness that changes", an "optical element having a refractive index that changes (a refractive index distribution type wavefront modulation lens and the like)", an "optical element having a thickness or a refractive index that changes due to coding or the like onto the lens surface (a wavefront modulation hybrid lens, an optical element formed as a phase plane on the lens surface, and the like)", and a "liquid crystal element that can modulate the phase distribution of light (a liquid crystal space phase modulation element and the like)" can be adopted as the EDoF means of the EDoF optical system 310. Thus, the present invention can be applied not only to the case in which regularly distributed image formation is possible by the optical wavefront modulation element (optical filter 311 (phase plate)) but also to a case in which the same distributed image as when the optical wavefront modulation element is used can be formed by the imaging lens 310A itself without using the optical wavefront modulation element.

The EDoF optical system 310 shown in FIG. 20 can be miniaturized since a focusing mechanism for mechanical focusing can be omitted. Therefore, the EDoF optical system 310 shown in FIG. 20 can be appropriately mounted in a mobile phone with a camera or a portable information terminal.

An optical image having passed through the EDoF optical system 310, in which the EDoF is realized, is formed on the image pickup element 312 shown in FIG. 19, and is converted into an electrical signal herein.

The image pickup element 312 is formed by a plurality of pixels arranged in a matrix based on a predetermined pattern arrangement (Bayer arrangement, G stripe and R/G full checker, X-Trans arrangement, honeycomb arrangement, and the like), and each pixel is configured to include a micro lens, a color filter (in this example, an RGB color filter), and a photodiode. The optical image incident on the light receiving surface of the image pickup element 312 through the EDoF optical system 310 is converted into signal charges of the amount corresponding to the amount of incident light by each of photodiodes arranged on the light receiving surface. Then, the signal charges of R, and B accumulated in each photodiode are sequentially output as voltage signals (image signals) for the respective pixels.

The AD conversion unit 314 converts the analog R, and B image signals, which are output from the image pickup element 312 for each pixel, into digital R, and B image signals. The digital image signals after being converted by the AD conversion unit 314 are added to a point image restoration processing block 320.

The point image restoration processing block 320 includes, for example, a black level adjusting unit 322, a white balance gain unit 323, a gamma processing unit 324, a demosaic processing unit 325, an RGB/YCrCb conversion unit 326, and a brightness signal Y point image restoration processing unit 327.

The black level adjusting unit 322 performs black level adjustment on the digital image signal output from the AD conversion unit 314. For the black level adjustment, a known method can be adopted. For example, when focus is given to a certain effective photoelectric conversion element, black level adjustment is performed by calculating the average of dark current amount acquisition signals corresponding to a plurality of OB photoelectric conversion elements included in a photoelectric conversion element row including the effective photoelectric conversion element and subtracting the average from the dark current amount acquisition signal corresponding to the effective photoelectric conversion element.

The white balance gain unit 323 performs gain adjustment corresponding to the white balance gain of each color signal of R, and B included in the digital image signal after adjusting the black level data.

The gamma processing unit 324 performs gamma correction to perform gradation correction of halftone or the like so that the R, and B image signals after the white balance adjustment have desired gamma characteristics.

The demosaic processing unit 325 performs demosaic processing on the R, and B image signals after the gamma correction. Specifically, the demosaic processing unit 325 generates a set of image signals (R signal, G signal, and B signal), which are output from the respective light receiving pixels of the image pickup element 312, by performing color interpolation processing on the R, and B image signals. That is, before the color demosaic processing, the pixel signal from each light receiving pixel is one of the R, and B image signals. However, after the color demosaic processing, a set of three pixel signals of R, and B signals corresponding to the respective light receiving pixels are output.

The RGB/YCrCb conversion unit 326 converts the R, and B signals for each pixel after the demosaic processing into the brightness signal Y and color difference signals Cr and Cb, and outputs the brightness signal Y and the color difference signals Cr and Cb for each pixel.

The brightness signal Y point image restoration processing unit 327 performs point image restoration processing on the brightness signal Y from the RGB/YCrCb conversion unit 326 based on a restoration filter stored in advance. For example, the restoration filter includes a deconvolution kernel having a kernel size of 7×7 (corresponding to the number of taps of M=7 and N=7) and a calculation coefficient (corresponding to restoration gain data and a filter coefficient) corresponding to the deconvolution kernel, and is used in the deconvolution processing for the phase modulation of the optical filter 311 (inverse convolution processing). In addition, the restoration filter is stored in a memory (not shown; for example, a memory in which the brightness signal Y point image restoration processing unit 327 is additionally provided) corresponding to the optical filter 311. In addition, the kernel size of the deconvolution kernel is not limited to 7×7.

Figure 21:
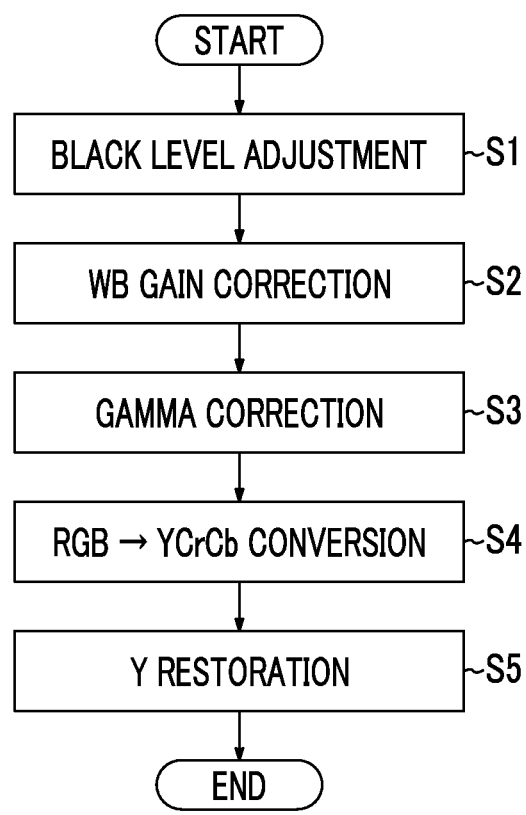
FIG. 21 is a flowchart showing an example of restoration processing in a restoration processing block shown in FIG. 19.

Next, the point image restoration processing of the point image restoration processing block 320 will be described. FIG. 21 is a flowchart showing an example of the point image restoration processing in the point image restoration processing block 320 shown in FIG. 19.

The digital image signal from the AD conversion unit 314 is applied to one input of the black level adjusting unit 322, and black level data is applied to the other input, and the black level adjusting unit 322 subtracts the black level data from the digital image signal, and outputs the digital image signal, from which the black level data has been subtracted, to the white balance gain unit 323 (step S1). Accordingly, since a black level component is no longer included in the digital image signal, a digital image signal indicating the black level becomes 0.

Processes of the white balance gain unit 323 and the gamma processing unit 324 are sequentially performed on the image data after black level adjustment (steps S2 and S3).

The R, and B signals after the gamma correction are subjected to demosaic processing by the demosaic processing unit 325, and are then converted into the brightness signal Y and the color difference signal Cr and Cb by the RGB/YCrCb conversion unit 326 (step S4).

The brightness signal Y point image restoration processing unit 327 performs point image restoration processing, which is for applying deconvolution processing for the phase modulation of the optical filter 311 of the EDoF optical system 310, on the brightness signal Y (step S5). That is, the brightness signal Y point image restoration processing unit 327 performs deconvolution processing (inverse convolution processing) between the brightness signal corresponding to a pixel group of a predetermined unit around an arbitrary pixel to be processed (here, a brightness signal of 7×7 pixels) and the restoration filter (7×7 deconvolution kernel and the calculation coefficient) stored in advance in a memory or the like. The brightness signal Y point image restoration processing unit 327 performs point image restoration processing for removing the image blurring of the entire image by repeating the deconvolution processing for each pixel group of the predetermined unit such that the entire region of the imaging surface is covered. The restoration filter is determined according to the position of the center of the pixel group for which the deconvolution processing is to be performed. That is, a common restoration filter is applied to the adjacent pixel group. In order to simplify the point image restoration processing, it is preferable that the common restoration filter is applied to all pixel groups.

Figure 22:
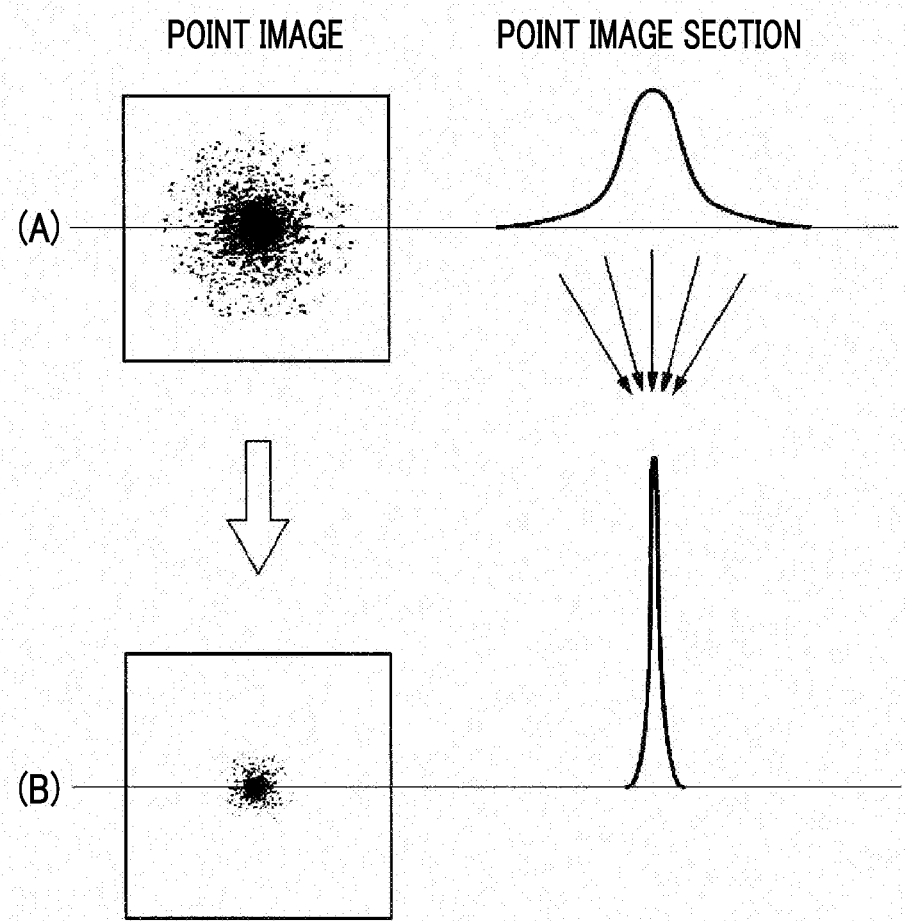
FIG. 22 is a diagram showing a state of a point image restored by the point image restoration processing.

As described above, in the same manner as in the example of application to the EDoF system, as shown in FIG. 22(A), the point image (optical image) of the brightness signal after passing through the EDoF optical system 310 is formed on the image pickup element 312 as a large point image (blurred image), but is restored to a small point image (high-resolution image) by deconvolution processing in the brightness signal Y point image restoration processing unit 327 as shown in FIG. 22(B).

Due to applying the point image restoration processing to the brightness signal after demosaic processing as described above, it is not necessary to set the parameters of point image restoration processing separately for R, and B. Therefore, it is possible to speed up the point image restoration processing. Instead of performing deconvolution processing with R, and B image signals corresponding to R, and B pixels at discrete positions as one unit, brightness signals of adjacent pixels are grouped into a predetermined unit, and deconvolution processing is performed by applying a common restoration filter to the unit. Therefore, the accuracy of the point image restoration processing is improved. For the color difference signals Cr and Cb, from the visualizing characteristics of the human eye, the image quality is acceptable even if the resolution is not increased by using the point image restoration processing. In addition, when recording an image in a compression format such as JPEG the color difference signals are compressed at a higher compression ratio than the brightness signal. Accordingly, there is little need to increase the resolution by using the point image restoration processing. In this manner, both an improvement in the restoration accuracy and simplification and speeding up of processing can be realized.

Also for the point image restoration processing of the EDoF system that has been described above, it is possible to apply the point image restoration processing according to each embodiment of the present invention.

[Other Embodiments in the Image Pickup Device]

In the above, a digital camera has been described as an embodiment of the image pickup device 100 of the present invention. However, the configuration of the image capturing device is not limited to thereto. As other image capturing devices of the present invention, for example, an internal or external camera for a PC or a portable terminal device having an imaging function, which will be described below, can be considered.

As a portable terminal device that is an embodiment of the image capturing device of the present invention, for example, a mobile phone, a smartphone, a personal digital assistant (PDA), and a portable game machine can be mentioned. Hereinafter, a smartphone will be described in detail as an example with reference to the diagrams.

Figure 23:
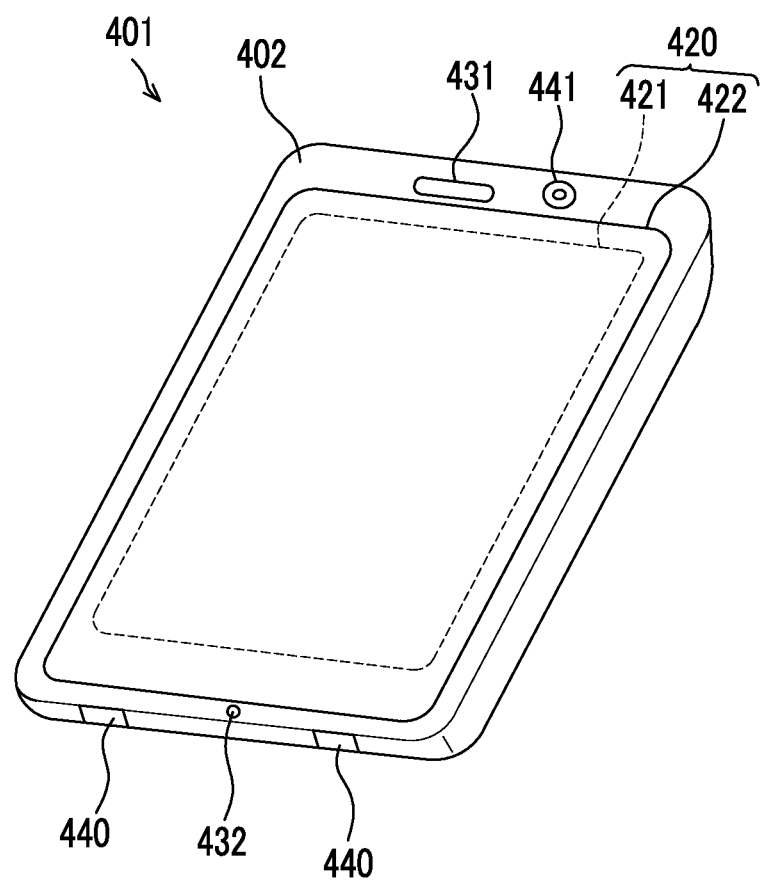
FIG. 23 is a diagram showing another form of the image pickup device.

FIG. 23 shows the appearance of a smartphone 401 that is an embodiment of the image capturing device of the present invention. The smartphone 401 shown in FIG. 23 includes a plate-shaped housing 402. On one surface of the housing 402, a display input unit 420 is provided in which a display panel 421 as a display unit and an operation panel 422 as an input unit are integrated. The housing 402 includes a speaker 431, a microphone 432, an operation unit 440, and a camera unit 441. The configuration of the housing 402 is not limited to this. For example, it is possible to adopt a configuration in which a display unit and an input unit are separated from each other, or it is possible to adopt a configuration having a folded structure or a sliding mechanism.

Figure 24:
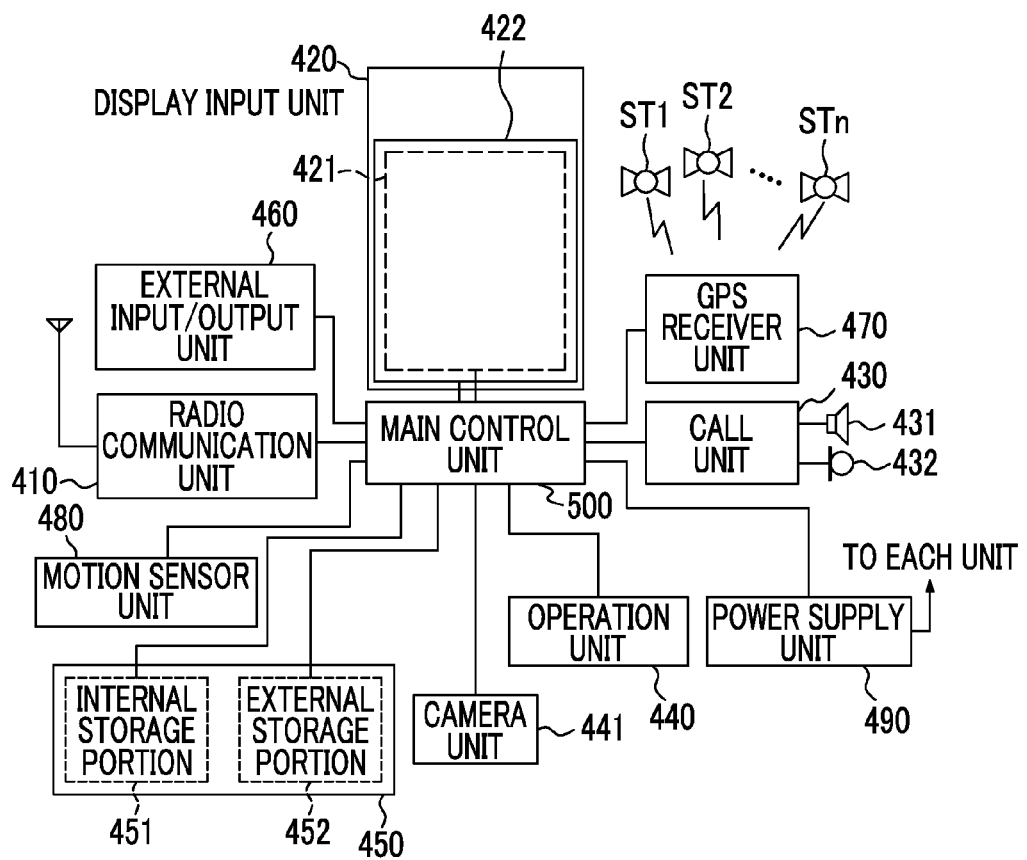
FIG. 24 is a block diagram showing the configuration of the image pickup device shown in FIG. 23.

FIG. 24 is a block diagram showing the configuration of the smartphone 401 shown in FIG. 23. As shown in FIG. 24, a radio communication unit 410, the display input unit 420, a call unit 430, the operation unit 440, the camera unit 441, a storage unit 450, an external input/output unit 460, a global positioning system (GPS) receiving unit 470, a motion sensor unit 480, a power supply unit 490, and a main control unit 500 are provided as main components of the smartphone. As a main function, the smartphone 401 has a radio communication function of performing mobile radio communication through a base station BS and a mobile communication network NW.

The radio communication unit 410 performs radio communication with the base station BS accommodated in the mobile communication network NW according to the instruction of the main control unit 500. By using the radio communication, various kinds of file data such as audio data and image data, electronic mail data, and the like are transmitted and received, or Web data, streaming data, and the like are received.

The display input unit 420 is a so-called touch panel that displays images (still and moving images), character information, and the like in order to visually transmit the information to the user and detects a user operation on the displayed information under the control of the main control unit 500, and includes the display panel 421 and the operation panel 422.

In the display panel 421, a liquid crystal display (LCD), an organic electro-luminescence display (OELD), or the like is used as a display device. The operation panel 422 is a device that is placed so that an image displayed on the display surface of the display panel 421 is visible and that detects one or more coordinates operated by a user's finger or a stylus. When the device is operated by a user's finger or a stylus, a detection signal generated due to the operation is output to the main control unit 500. Then, the main control unit 500 detects an operation position (coordinates) on the display panel 421 based on the received detection signal.

As shown in FIG. 23, the display panel 421 and the operation panel 422 of the smartphone 401 illustrated as an embodiment of the image capturing device of the present invention are integrated to form the display input unit 420. However, the operation panel 422 is disposed so as to completely cover the display panel 421. When such an arrangement is adopted, the operation panel 422 may have a function of detecting a user operation for a region outside the display panel 421. In other words, the operation panel 422 may include a detection region of an overlapping portion that overlaps the display panel 421 (hereinafter, referred to as a display region) and a detection region of the other outer edge portion that does not overlap the display panel 421 (hereinafter, referred to as a non-display region).

Although the size of the display region and the size of the display panel 421 may be completely the same, the size of the display region and the size of the display panel 421 may not necessarily be the same. The operation panel 422 may include two sensitive regions of an outer edge portion and the other inner portion. The width for the outer edge portion may be appropriately designed according to the size of the housing 402 or the like. As a position detection method adopted in the operation panel 422, a matrix switch method, a resistance film method, a surface acoustic wave method, an infrared method, an electromagnetic induction method, an electrostatic capacitance method, and the like can be mentioned, and it is possible to adopt any of the methods.

The call unit 430 includes the speaker 431 or the microphone 432. The call unit 430 converts the voice of the user, which is input through the microphone 432, into audio data that can be processed by the main control unit 500, and outputs the audio data to the main control unit 500. Alternatively, the call unit 430 decodes audio data received by the radio communication unit 410 or the external input/output unit 460, and outputs the audio data from the speaker 431. For example, as shown in FIG. 23, the speaker 431 can be mounted on the same surface as a surface on which the display input unit 420 is provided, and the microphone 432 can be mounted on the side surface of the housing 402.

The operation unit 440 is a hardware key using a key switch or the like, and receives an instruction from the user. For example, as shown in FIG. 23, the operation unit 440 is a push button type switch that is mounted on the side surface of the housing 402 of the smartphone 401 and that is turned on when pressed with a finger or the like and is turned off by the restoring force of a spring or the like when the finger is released.

The storage unit 450 stores a control program or control data of the main control unit 500, application software, address data in which the name, telephone number, and the like of the communications partner are associated with each other, transmitted or received e-mail data, web data downloaded by web browsing, or downloaded content data, and temporarily stores streaming data or the like. In addition, the storage unit 450 is formed by an internal storage portion 451 that is built into the smartphone and an external memory portion 452 having a detachable external memory slot. Each of the internal storage portion 451 and the external memory portion 452 that form the storage unit 450 is realized using storage media, such as a flash memory type memory, a hard disk type memory, a multimedia card micro type memory, a card type memory (for example, a MicroSD (registered trademark) memory), a random access memory (RAM), and a read only memory (ROM).

The external input/output unit 460 plays a role of interfacing with all external devices connected to the smartphone 401, and is directly or indirectly connected to other external devices through communication (for example, a universal serial bus (USB) or IEEE 1394) or a network (for example, the Internet, wireless LAN, Bluetooth®, radio frequency identification (RFID), infrared data association (IrDA®), Ultra Wideband (UWB®), or ZigBee®).

Examples of the external device connected to the smartphone 401 include a wired/wireless headset, a wired/wireless external charger, a wired/wireless data port, a memory card or a subscriber identity module (SIM)/user identity module (UIM) card connected through a card socket, an external audio/video device connected through an audio•video input/output (I/O) terminal, an external audio•video device that is wirelessly connected, a smartphone that is connected in a wired/wireless manner, a personal computer that is connected in a wired/wireless manner, a PDA that is connected in a wired/wireless manner, and earphones. Through the external input/output unit, it is possible to transmit data received from such an external device to each component inside the smartphone 401 or to transmit data inside the smartphone 401 to the external device.

The GPS receiving unit 470 receives GPS signals transmitted from GPS satellites ST1 to STn, performs positioning calculation processing based on the plurality of received GPS signals, and detects a position including the latitude, longitude, and altitude of the smartphone 401, according to the instruction of the main control unit 500. When position information can be acquired from the radio communication unit 410 or the external input/output unit 460 (for example, a wireless LAN), the GPS receiving unit 470 can detect the position using the position information.

The motion sensor unit 480 includes, for example, a three-axis acceleration sensor, and detects the physical movement of the smartphone 401 according to the instruction of the main control unit 500. By detecting the physical movement of the smartphone 401, the movement direction or acceleration of the smartphone 401 is detected. The detection result is output to the main control unit 500.

The power supply unit 490 supplies electric power stored in a battery (not shown) to each unit of the smartphone 401 according to the instruction of the main control unit 500.

The main control unit 500 includes a microprocessor, operates according to the control program or control data stored in the storage unit 450, and performs overall control of the respective units of the smartphone 401. In addition, in order to perform voice communication or data communication through the radio communication unit 410, the main control unit 500 has a mobile communication control function of controlling each unit of the communication system and an application processing function.

The application processing function is realized by the operation of the main control unit 500 according to the application software stored in the storage unit 450. Examples of the application processing function include an infrared communication function for performing data communication with other devices by controlling the external input/output unit 460, an e-mail function for transmission and reception of an e-mail, a Web browsing function for browsing web pages, and the like.

The main control unit 500 has an image processing function of displaying a video on the display input unit 420 based on image data (data of a still image or a moving image), such as received data or downloaded streaming data. The image processing function refers to a function when the main control unit 500 decodes the above-described image data, performs image processing on the decoding result, and displays an image on the display input unit 420.

In addition, the main control unit 500 performs display control of the display panel 421 and operation detection control for detecting a user operation through the operation unit 440 and the operation panel 422.

By the execution of the display control, the main control unit 500 displays an icon for starting application software or a software key, such as a scroll bar, or displays a window for creating an e-mail. The scroll bar refers to a software key for receiving an instruction to move a display portion of, for example, a large image that cannot be fitted in the display region of the display panel 421.

In addition, by the execution of the operation detection control, the main control unit 500 detects a user operation through the operation unit 440, receives an operation of the above icon or an input of a character string to the input field of the above window through the operation panel 422, or receives a display image scroll request through the scroll bar.

In addition, by the execution of the operation detection control, the main control unit 500 has a touch panel control function of controlling the sensitive region of the operation panel 422 or the display position of a software key by determining whether the operation position of the operation panel 422 is an overlapping portion (display region) that overlaps the display panel 421 or the other outer edge portion (non-display region) that does not overlap the display panel 421.

The main control unit 500 can also detect a gesture operation on the operation panel 422 and execute a function set in advance in response to the detected gesture operation. The gesture operation does not mean a conventional simple touch operation, but means drawing a locus with a finger, or designating a plurality of positions simultaneously, or drawing a locus for at least one of the plurality of positions by combining these.

The camera unit 441 is a digital camera that performs imaging electronically using an image pickup element, such as a complementary metal oxide semiconductor (CMOS) or a charge-coupled device (CCD). In addition, the camera unit 441 can convert image data obtained by imaging into compressed image data, for example, into joint photographic coding experts group (JPEG) image data, and can record the compressed image data in the storage unit 450 or output the compressed image data through the external input/output unit 460 or the radio communication unit 410, under the control of the main control unit 500. In the smartphone 401 shown in FIG. 23, the camera unit 441 is mounted on the same surface as the display input unit 420. However, the mounting position of the camera unit 441 is not limited thereto, and the camera unit 441 may be mounted on the back of the display input unit 420 or a plurality of camera units 441 may be mounted. When a plurality of camera units 441 are mounted, it is possible to perform imaging using only the camera unit 441 provided for the imaging, or it is possible to perform imaging using the plurality of camera units 441 simultaneously.

The camera unit 441 can be used for various functions of the smartphone 401. For example, an image acquired by the camera unit 441 can be displayed on the display panel 421, or an image of the camera unit 441 can be used as one of the operation inputs of the operation panel 422. In addition, when the GPS receiving unit 470 detects a position, it is possible to detect the position with reference to the image from the camera unit 441. With reference to the image from the camera unit 441, it is also possible to determine the direction of the optical axis of the camera unit 441 of the smartphone 401 or to determine the current use environment without using a three-axis acceleration sensor or in combination with the three-axis acceleration sensor. Needless to say, it is also possible to use the image from the camera unit 441 in the application software.

In addition, position information acquired by the GPS receiving unit 470, audio information (may be text information obtained by performing audio/text conversion with the main control unit or the like) acquired by the microphone 432, posture information acquired by the motion sensor unit 480, and the like can be added to the image data of a still image or a moving image, and the result can be recorded in the storage unit 450 or can be output through the external input/output unit 460 or the radio communication unit 410.

The object of the present invention is also achieved when a computer (or a CPU or an MPU) of a system or an apparatus reads program codes from a storage medium, in which the program codes (program) for realizing the procedure of the flow shown as the embodiment described above are stored, and executes the program codes.

In this case, the program codes themselves read from the storage medium realize the function of the embodiment described above. Therefore, the program codes and a computer-readable storage medium in which the program codes are stored/recorded can also form one of the present invention.

As examples of storage media for supplying such program codes, it is possible to use a Floppy® disk, a hard disk, an optical disc, a magneto-optical disc, a CD-ROM, a CD-R, a magnetic tape, a nonvolatile memory card, and a ROM.

In addition, the function of the embodiment described above is realized by executing the read program with a computer. In addition, the execution of this program includes a case in which an OS or the like operating on a computer performs some or all of actual processes based on the instruction of the program.

In addition, the function of the embodiment described above can also be realized by a function expansion board inserted into the computer or a function expansion unit connected to a computer. In this case, a program read from the storage media is first written into a memory provided in the function expansion board inserted into the computer or the function expansion unit connected to the computer. Then, based on the instruction of the program, a CPU or the like provided in the function expansion board or the function expansion unit performs some or all of actual processes. The function of the embodiment described above is also realized by processing using such an expansion board or an expansion unit.

In addition, each step of the flow of the embodiment described above is not limited to being realized using software (computer), and may be realized using hardware (electronic circuit).

EXPLANATION OF REFERENCES

100: image pickup device
101: target external display device
101: external display device
105: image pickup device body
111: display unit
212: CPU
214: operation unit
216: device control unit
218: lens unit
220: shutter
222: image pickup element
224: A/D conversion unit
225: check image display unit
226: memory unit
227: check image display control unit
228: image processing unit
229: point image restoration processing unit
230: encoder
232: driver
240: chart storage unit
242: chart transmission control unit
244: calibration necessity determination unit
245: imaging environment determination unit
246: calibration control unit
247: calibration execution unit
248: image pickup unit
270: chart receiving unit
272: chart display control unit
1: calibration system
301: imaging module
310: EDoF optical system
401: smartphone
421: display panel

What is claimed is:

1. An image pickup device, comprising:
an image pickup unit;
a chart storage medium that stores a calibration chart relating to parameters of point image restoration processing; and
a processor configured to perform,
transmitting the calibration chart stored in the chart storage medium to an external display device,
determining whether or not calibration of the parameters of the point image restoration processing is required based on a calibration image, which is obtained by imaging the calibration chart displayed on the external display device using the image pickup unit, and outputting the determination result,
controlling execution of the calibration by outputting a calibration execution command when it is determined that the calibration is required according to the determination regarding whether or not the calibration is required,
performing the calibration of the parameters of the point image restoration processing based on the calibration image in response to the calibration execution command,
wherein the image pickup unit has a bracketing imaging mode, and
the processor performs the calibration of the parameters of the point image restoration processing based on a plurality of the calibration images captured by the image pickup unit after selection of the bracketing imaging mode,
wherein the image pickup unit is synchronized with the external display device, and
the image pickup unit images the calibration chart that is displayed in synchronization with the external display device according to imaging of the image pickup unit in the bracketing imaging mode.

2. The image pickup device according to claim 1,
wherein the image pickup unit acquires the calibration image under some of a plurality of imaging conditions in the bracketing imaging mode, and
the processor performs the calibration of the parameters of the point image restoration processing based on the calibration image captured under some of the plurality of imaging conditions.

3. The image pickup device according to claim 1,
wherein the image pickup unit is synchronized with the external display device, and the image pickup unit images the calibration chart that is displayed in synchronization with the external display device according to imaging of the image pickup unit.

4. The image pickup device according to claim 1, the processor further configured to perform:
   determining whether or not an imaging environment is suitable for acquisition of the calibration image based on the calibration image,
   wherein the processor further controls execution of the calibration according to the determination regarding whether or not the imaging environment is suitable for acquisition of the calibration image.

5. The image pickup device according to claim 4,
   wherein the chart storage medium further has an environment determination chart,
   the processor further transmits an environment determination chart to the external display device, and
   the processor determines whether or not the imaging environment is suitable for acquisition of the calibration image based on an environment determination image obtained by imaging the environment determination chart displayed on the external display device using the image pickup unit or based on the environment determination image and the calibration image.

6. The image pickup device according to claim 4,
   wherein the processor determines whether or not the imaging environment is suitable for acquisition of the calibration image based on a plurality of the calibration images.

7. The image pickup device according to claim 5,
   wherein the processor determines whether or not the imaging environment is suitable for acquisition of the calibration image based on a plurality of the environment determination images or based on one or a plurality of the environment determination images and one or a plurality of the calibration images.

8. The image pickup device according to claim 1,
   wherein the processor acquires information regarding display performance of the external display device, and transmits the calibration chart corresponding to the display performance to the external display device.

9. The image pickup device according to claim 5,
   wherein the processor acquires information regarding display performance of the external display device, and transmits the calibration chart and the environment determination chart corresponding to the display performance to the external display device.

10. The image pickup device according to any claim 1, the processor further configured to perform:
    performing point image restoration processing on an image captured by the image pickup unit,
    wherein the processor performs the point image restoration processing using parameters of the point image restoration processing after the calibration.

11. The image pickup device according to claim 1,
    wherein the image pickup device performs imaging under imaging conditions corresponding to parameters of the point image restoration processing after the calibration, and has a preferential imaging mode in which the point image restoration processing is preferentially performed using parameters of the point image restoration processing after the calibration.

12. The image pickup device according to claim 1, further comprising:
    a check image display control unit and a check image display unit,
    wherein the check image display control unit displays information indicating that the calibration has been completed on the check image display unit when imaging is performed using imaging conditions corresponding to parameters of the point image restoration processing after the calibration.

13. The image pickup device according to claim 4, further comprising:
    a check image display control unit and a check image display unit,
    wherein the check image display control unit displays a warning sign on the check image display unit when the imaging environment determination unit determines that the imaging environment is not suitable.

14. The image pickup device according to claim 12,
    wherein the check image display control unit displays a check image before main imaging and information indicating that the calibration has been completed on the check image display unit, according to a preliminary imaging instruction signal.

15. The image pickup device according to claim 12,
    wherein the check image display control unit displays information indicating that the calibration has been completed on the check image display unit when displaying a captured image that has been captured by the image pickup unit under imaging conditions corresponding to the parameters of point image restoration processing after the calibration.

16. The image pickup device according to claim 1,
    wherein the image pickup unit includes a replaceable lens.

17. The image pickup device according to claim 1,
    wherein the image pickup unit includes a lens that extends a depth of field by modulating a phase.

18. A calibration method using a processor, comprising:
    a chart transmission control step that the processor transmits a calibration chart relating to parameters of point image restoration processing to an external display device;
    a calibration necessity determination step that the processor determines whether or not calibration of the parameters of the point image restoration processing is required based on a calibration image, which is obtained by imaging the calibration chart displayed on the external display device using the image pickup unit, and outputting the determination result;
    a step that the processor outputs a calibration execution command according to the determination regarding whether or not the calibration is required that is output in the calibration necessity determination step; and
    a calibration execution step that the processor performs the calibration of the parameters of the point image restoration processing based on the calibration execution command and the calibration image using the processor, and
    wherein the image pickup unit has a bracketing imaging mode, and
    the processor performs the calibration of the parameters of the point image restoration processing based on a plurality of the calibration images captured by the image pickup unit after selection of the bracketing imaging mode, and
    wherein the image pickup unit is synchronized with the external display device, and
    the image pickup unit images the calibration chart that is displayed in synchronization with the external display device according to imaging of the image pickup unit in the bracketing imaging mode.

19. A non-transitory computer readable medium storing a program, the program causing a computer to execute:
- a chart transmission control step of transmitting a calibration chart relating to parameters of point image restoration processing to an external display device;
- a calibration necessity determination step of determining whether or not calibration of the parameters of the point image restoration processing is required based on a calibration image, which is obtained by imaging the calibration chart displayed on the external display device using the image pickup unit, and outputting the determination result;
- a step of outputting a calibration execution command according to the determination regarding whether or not the calibration is required that is output in the calibration necessity determination step; and
- a calibration execution step of performing the calibration of the parameters of the point image restoration processing based on the calibration execution command and the calibration image using a calibration execution unit, and
  - wherein the image pickup unit has a bracketing imaging mode, and
- the calibration execution unit performs the calibration of the parameters of the point image restoration processing based on a plurality of the calibration images captured by the image pickup unit after selection of the bracketing imaging mode, and
- wherein the image pickup unit is synchronized with the external display device, and
- the image pickup unit images the calibration chart that is displayed in synchronization with the external display device according to imaging of the image pickup unit in the bracketing imaging mode.

20. An image pickup device, comprising:
- an image pickup unit;
- a chart storage medium that stores a calibration chart relating to parameters of point image restoration processing; and
- a processor configured to perform,
- transmitting the calibration chart stored in the chart storage medium to an external display device,
- determining whether or not calibration of the parameters of the point image restoration processing is required based on a calibration image, which is obtained by imaging the calibration chart displayed on the external display device using the image pickup unit, and outputting the determination result,
- controlling execution of the calibration by outputting a calibration execution command when it is determine that the calibration is required according to the determination regarding whether or not the calibration is required,
- performing the calibration of the parameters of the point image restoration processing based on the calibration image in response to the calibration execution command,
- determining whether or not an imaging environment is suitable for acquisition of the calibration image based on the calibration image,
- wherein the processor further controls execution of the calibration according to the determination regarding whether or not the imaging environment is suitable for acquisition of the calibration image,
- wherein the chart storage medium further has an environment determination chart,
- the processor further transmits an environment determination chart to the external display device, and
- the processor determines whether or not the imaging environment is suitable for acquisition of the calibration image based on an environment determination image obtained by imaging the environment determination chart displayed on the external display device using the image pickup unit or based on the environment determination image and the calibration image.

21. An image pickup device, comprising:
- an image pickup unit;
- a chart storage medium that stores a calibration chart relating to parameters of point image restoration processing; and
- a processor configured to perform,
- transmitting the calibration chart stored in the chart storage medium to an external display device,
- determining whether or not calibration of the parameters of the point image restoration processing is required based on a calibration image, which is obtained by imaging the calibration chart displayed on the external display device using the image pickup unit, and outputting the determination result,
- controlling execution of the calibration by outputting a calibration execution command when it is determine that the calibration is required according to the determination regarding whether or not the calibration is required,
- performing the calibration of the parameters of the point image restoration processing based on the calibration image in response to the calibration execution command,
- determining whether or not an imaging environment is suitable for acquisition of the calibration image based on the calibration image,
- wherein the processor further controls execution of the calibration according to the determination of the imaging environment determination unit regarding whether or not the imaging environment is suitable for acquisition of the calibration image, and
- a check image display control unit and a check image display unit;
- wherein the check image display control unit displays a warning sign on the check image display unit when the imaging environment determination unit determines that the imaging environment is not suitable.

* * * * *